(12) United States Patent
Bealing et al.

(10) Patent No.: US 8,339,410 B2
(45) Date of Patent: Dec. 25, 2012

(54) COMPUTER-AIDED METHODS AND SYSTEMS FOR PATTERN-BASED COGNITION FROM FRAGMENTED MATERIAL

(75) Inventors: Steven A. Bealing, Singapore (SG); Michael A. Cheveldave, Castlegar (CA); Peter R. Stanbridge, Cheltenham (GB); Kenneth J. -P. McHugh, Singapore (SG); David J. Snowden, Marlborough (GB)

(73) Assignee: Cognitive Edge Pte Ltd, Singapore (SG)

( * ) Notice: Subject to any disclaimer, the term of this patent is extended or adjusted under 35 U.S.C. 154(b) by 0 days.

(21) Appl. No.: 13/251,032

(22) Filed: Sep. 30, 2011

(65) Prior Publication Data

US 2012/0036131 A1 Feb. 9, 2012

Related U.S. Application Data

(63) Continuation of application No. 12/371,552, filed on Feb. 13, 2009, now Pat. No. 8,031,201.

(51) Int. Cl.
*G06T 15/40* (2011.01)

(52) U.S. Cl. ........ 345/581; 707/687; 345/419; 345/585; 345/619; 345/645; 702/152; 702/155

(58) Field of Classification Search .................. 707/687; 702/419; 345/581–585, 619, 645
See application file for complete search history.

(56) References Cited

U.S. PATENT DOCUMENTS

| | | | |
|---|---|---|---|
| 5,825,498 A * | 10/1998 | Thakur et al. .................. 356/394 |
| 7,136,791 B2 | 11/2006 | Darwent | |
| 7,366,705 B2 | 4/2008 | Zeng | |
| 7,370,023 B1 | 5/2008 | Forsythe | |
| 7,609,257 B2 * | 10/2009 | Wright et al. .................. 345/419 |
| 2002/0070953 A1 * | 6/2002 | Barg et al. ...................... 345/700 |
| 2002/0091991 A1 * | 7/2002 | Castro ........................... 717/106 |
| 2002/0198871 A1 * | 12/2002 | Auspitz et al. ..................... 707/3 |
| 2003/0105409 A1 * | 6/2003 | Donoghue et al. ............. 600/545 |
| 2004/0006567 A1 | 1/2004 | Kurtz | |
| 2004/0109592 A1 | 6/2004 | Bankman | |
| 2004/0199375 A1 | 10/2004 | Ehsani | |
| 2005/0218025 A1 | 10/2005 | Brignoni | |
| 2006/0155615 A1 * | 7/2006 | Loo et al. ......................... 705/27 |
| 2006/0239547 A1 * | 10/2006 | Robinson et al. ............. 382/162 |
| 2007/0046486 A1 * | 3/2007 | Donoghue et al. ........ 340/825.19 |
| 2007/0207555 A1 * | 9/2007 | Guerra et al. .................. 436/518 |
| 2008/0040360 A1 | 2/2008 | Meijer | |
| 2008/0140348 A1 | 6/2008 | Frank | |
| 2009/0082637 A1 | 3/2009 | Galperin | |
| 2010/0017143 A1 * | 1/2010 | Nagalla et al. .................. 702/19 |
| 2010/0070448 A1 * | 3/2010 | Omoigui ......................... 706/47 |
| 2010/0088264 A1 | 4/2010 | Teverovskiy | |
| 2010/0211603 A1 * | 8/2010 | Bealing et al. ................ 707/776 |

* cited by examiner

*Primary Examiner* — Hanh Thai
(74) *Attorney, Agent, or Firm* — Christensen O'Connor Johnson Kindness PLLC

(57) ABSTRACT

A method for obtaining and analyzing information objects including generating, collecting or discovering information objects. The information objects are signified at least in part using deliberately ambiguated signifier prompts, for example, linear scale opposing negatives or positives, and/or multi-dimensional signifier prompts. The information objects may comprise text or non-text fragments, and may be generated or selected. The responses to the signifier prompts are stored with the fragments to provide a dataset of signified fragments. The signified fragments may be analyzed based on the signifiers and can be utilized as part of an explorable knowledge repository, or objective measures can be created to aid in mass opinion capture or human attitude auditing. The fragments may be represented on a graphical template. In one embodiment, fragment exemplars are identified that exemplify significant locations on the template, and the exemplar signifiers are used to automatically locate other signified fragments on the template.

15 Claims, 10 Drawing Sheets

IN THIS STORY THE COMPANY'S LEADERS...

HAVE ABSOLUTELY NO CONFIDENCE TO MAKE ANY DECISION ○○○○○○○ ARE SO CONFIDENT AND INVINCIBLE THEY BELIEVE THEY'LL NEVER MAKE A MISTAKE

☐ DOES NOT APPLY

HERE, THE COMPANY PROCESSES, TOOLS, AND SYSTEMS ARE...

COMPLETELY NON-EXISTENT OR SO USELESS THAT THEY CAUSE A TON OF WORK ○○○○○○○ ARE SO EXCESSIVE AND COMPLICATED THAT WE SPEND TOO MUCH TIME TRYING TO SATISFY PROCESS

☐ DOES NOT APPLY

IN THIS STORY LEADERS FEEL THAT IT'S IMPORTANT TO...

GET TASKS DONE FAST AND EFFECTIVELY EVEN IF IT COMPROMISES QUALITY OF WORK ○○○○○○○ BE DRIVEN BY PERFECTION EVEN IF IT TAKES A LONG TIME TO GET ANYTHING DONE

☐ DOES NOT APPLY

IN THE STORY LEADERSHIP BEHAVIOR REFLECTS A BELIEF THAT...

INDIVIDUAL TARGETS SHOULD BE ACHIEVED AT ANY COST; PERSONAL RELATIONSHIPS DON'T MATTER ○○○○○○○ IT'S ALL ABOUT PERSONAL RELATIONSHIPS AND TARGETS SHOULD BE COMPROMISED TO MAINTAIN PERSONAL RELATIONSHIPS

☐ DOES NOT APPLY

*Fig.1.*

COMPUTER-AIDED METHODS AND SYSTEMS FOR PATTERN-BASED COGNITION FROM FRAGMENTED MATERIAL

CROSS-REFERENCE TO RELATED APPLICATION

This application is a continuation of application Ser. No. 12/371,552, filed Feb. 13, 2009, the entire disclosure of which is hereby incorporated by reference herein.

BACKGROUND

The confusion of correlation with causation represents a real issue for management science and is endemic in the practice of knowledge management; indeed the whole issue of causation in social systems is problematic. The issue is well summarized in a metaphor from Christensen & Raynor ("Why Hard-Nosed Executives Should Care About Management Theory" *Harvard Business Review*, September 2003, pp. 67-74) as follows:

Imagine going to your Doctor because you're not feeling well. Before you've had a chance to describe your symptoms, the doctor writes out a prescription and says "take two of these three times and day, and call me in a week."

"But—I haven't told you what's wrong," you say. "How do I know this will help me?"

"Why wouldn't it" says the doctor. "It worked for the last two patients."

No competent doctor would ever practice medicine like this, nor would any sane patient accept it if they did. Yet professors and consultants routinely prescribe such generic advice, and managers routinely accept such therapy, in the naïve belief that if a particular course of action helped other companies to succeed, it ought to help theirs too.

A complex adaptive system ("CAS") is a system that is complex (diverse and made up of multiple interconnected elements) and adaptive (has the capacity to change and learn from experience). A CAS has high levels of uncertainty in which outcomes are inherently unknowable. The same thing only happens the same way twice by accident, and the system is highly vulnerable to massive outcome changes based on small perturbations in ways that cannot be predicted. A CAS can be best understood and managed as an evolving system. This requires a rethinking of risk management from probabilistic models based on possible outcomes, to an understanding of the degree of stability and volatility within the system. In addition, cognitive science has transformed our understanding of how humans make decisions, challenging the model of human decision making as one of rational choices based on personal self interests, to one based on matching patterns acquired through experience or through the transfer of narratives and other fragmented material.

Complex Adaptive Systems

Traditionally, systems have been viewed as falling into either of two broad categories:

Ordered systems are systems in which there are repeating relationships between cause and effect that can be discovered by empirical observation, analysis, and other investigatory techniques. Once those relationships are discovered, we can use our understanding of them to predict the future behavior of the system and to manipulate it towards a desired end state.

Chaotic systems are systems in which the agents are unconstrained and present in large numbers. For this reason, we can gain insight into the operation of such systems by the application of statistics, probability distributions, and the like. The number and the independence of the agents allow large number mathematics to come into play.

A third type of system is a CAS, wherein agent behavior is loosely constrained by the system, but in turn, the agents modify the system through their interactions with themselves and the system. In this context, an agent is defined as anything that acts (it can be an individual, a group, an idea, a regulation, etc.). The mutual interaction produces an inherently unpredictable system. A CAS is highly susceptible to minor changes or weak signals, sometimes illustrated by the cliché of the flapping butterfly's wing. However, given the multifaceted nature of systems and these broad definitions, systems may have characteristics that stretch across multiple categories of these above-described system types.

As constraints in an ordered system change, a system can shift to being complex, or even collapse into chaos. For example, attempting to exert excessive control through bureaucracy may build up tension through frustration, which can lead to a collapse of control and increased levels of fraud.

A CAS can appear chaotic or, with the benefit of hindsight, as ordered. This latter case is described as retrospective coherence. After something has happened, it is easy to see the significant pattern of events, but detecting the pattern in advance may be virtually impossible using prior art information systems. Detecting relevant patterns early is known as weak signal detection.

Most (if not all) human systems are CAS. We respond and adapt to local interactions and we are constrained by systems, but we are also capable of modifying those systems. Small inputs or perturbations may lead to unintended and unforeseeable consequences. Once sufficiently disturbed, such a system is altered irreversibly and will not return to the previous equilibrium state. If we reduce the system constraints, increase agent interactivity, and increase the variety of those agents and their environment, then radically new patterns become possible. If we understand that a system is a CAS, then our expectations of decisions are different. We are not making decisions based on forecastable outcomes and best practice, as both are impossible. We cannot adopt an approach based on fail-safe design, but have to switch to safe-fail experiments and monitor for the emergence of patterns. Some patterns we amplify and some we dampen depending on the evolutionary direction we wish the system to take. We thus influence the evolution of the system towards an unknowable future state; we do not waste energy in trying to achieve a predefined system outcome.

The Basis of Human Intelligence

Klein (Klein, G., "Sources of Power: How People Make Decisions" MIT 1998) established in his research into decision making that humans make decisions on a first fit pattern match, either with past or hypothecated future experience. The choice of patterns is one of satisfying, not optimizing; it is not the best fit, but the first fit patterns that are used. This is radically different from the information processing, rational decision maker that is typically assumed. We do not scan all available information, but perhaps only 5-10%. Based on this partial scan, we match against patterns stored in our memory and perform a first fit pattern match against those patterns.

In addition, the idea of distributed cognition is central to the application of complexity to human systems and has profound implications for knowledge management. Complexity based approaches to management handle ambiguity and uncertainty by avoiding central control and allowing high levels of agent interaction to create emergent patterns of meaning.

Humans as Fragmented Processors

Humans are pattern processors. Our response to experiences, in particular those of tolerated failure, create vivid patterns through which we filter data and make decisions. A major distinguishing feature of human intelligence is our propensity to create cultures that increase familial and tribal bonds, and to pass on knowledge other than through genetic evolution and experience: we are, at our very essence, storytellers. The greater part of our evolutionary history has been spent in an oral tradition, and the modern environment of social computing, comprising multiple fragmented conversations, can be viewed as a return to (or arguably just a continuation of) an oral tradition.

Stories and other fragmented material are also fractal in nature and are linked to common work and social group experience. When a family assembles for a wedding or funeral, the family members will retell the identity stories of their family. The same is true of work groups, organizations, and cultures—all of which are self-similar and provide a capacity for common action. Engineers working on a long-term project create stories that define the experience and key learnings that they derive. Mentors tell stories of their own experiences to those they mentor and those mentored, in their turn, modify those teaching stories and create their own. To understand what we know and how we know it, and by implication how we make decisions, we need to understand the multi-facetted narratives of our day-to-day discourse.

A broader definition of fragmented material ("fragments"), also called "information objects", includes anything that allows people to make sense of the world: paintings, pictures, sacred objects, blogs and the like. Naturally occurring stories typically come as fragmented anecdotes. Occasionally you get a fully formed and developed story, but mostly they are anecdotal, often only one or two paragraphs long when transcribed. Paintings and pictures are often a better form of fragmented expression than a pure story in textual form. A story is always told in a context, from a context. It will trigger a reaction that is not necessarily consistent with what was intended by the storyteller. Each reader has his or her own context and situation.

Semantic Approach

A consistent belief among many in the western world is that everything is reducible to its machine-like components. Semantic approaches, as exemplified by visions of the Semantic Web—an evolving extension of the World Wide Web, use highly ordered building blocks and elaborate algorithms. Semantic approaches are typically directed to standardization, formats and microformats, and strive to be explicit and unambiguous in characterizing objects and their relationships to other objects, through tags, ontologies, Resource Description Framework, taxonomies, and the like.

Natural language processing is an additional semantic approach where software attempts to understand the meaning of a piece of text. The fundamental ambiguity of language, its dependence on context for meaning, and other complexities (e.g., sarcasm, poor spelling, poor grammar, dialects, and unconventional writing styles), make it impossible to automate the process of extracting anything beyond superficial meaning from an individual piece of text.

Boisot (Boisot, M., *Knowledge Assets* Oxford 1998) argues that the most valuable knowledge is codified (to be easily shared and re-used), undiffused (proprietary) and abstracted (key learnings are taken from the world and useful understandings and models are created that can be used in other contexts to make sense of a new environment and to aid in decision making). The least valuable knowledge is un-codified (difficult to share and re-use), diffused (widely-distributed, non-proprietary), and concrete (this can be thought of as very specific descriptions with no abstraction of meaning, similar to raw field intelligence). Using this model, the current internet is widely diffused and has a reasonable level of codification, but generally lacks abstraction. The Semantic Web will significantly increase the level of codification but will only slightly increase the level of abstraction—hence, only marginal net improvement in net knowledge value.

There remains a need, therefore, for increasing the abstraction (allowing re-contextualization or blending codified models to different contexts) of information objects, with improvements to codification for creating more valuable knowledge assets.

Early related work by one of the present inventors and others is described in U.S. Pat. No. 7,136,791, which is hereby incorporated by reference. In particular, specific methods for eliciting narrative materials are disclosed therein.

U.S. Patent Publication No. 2004/0006567, for which one of the present inventors is also a co-inventor, is also incorporated by reference.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Methods are disclosed for collecting, signifying, analyzing and using information objects. In a particular method for signifying information objections, for example, the user obtains a plurality of information objects, provides the information objects and deliberately ambiguated signifier prompts to an indexer for signification. In an exemplary deliberately ambiguated signifier prompts the indexer's response is an indicated position along a continuum having a plurality of labeled points wherein none of the labeled points are a desired or ideal response. The indexers' responses are typically then stored with the information objects. The information objects may be textual or non-textual, and may be obtained using a commercially available search engine, generated by the indexer, or the like.

The indexer may be provided with additional signification tools, for example multiple choice prompts, naming and/or tagging fields, and/or keywords. The responses may be signified by including information about the indexer.

Deliberately ambiguated signifier prompts may comprise liner scales with terminal or end-point labels, two- or three-dimensional figures with labels, or the like. When using two- or three-dimensional figures, the signification may comprise a calculated distance.

In an embodiment, the signifier responses to the deliberately ambiguated signifier prompts are represented or visualized using a landscape formed with peaks and valleys that indicate the collective responses or significations of the information object or objects.

Using landscapes in discovery and representation allows researchers to represent belief systems that can support decisions on how to influence those beliefs to change and to modify them. When the stability of a system is being explored, the landscape is commonly referred to as a fitness landscape.

For example, the landscape may be used to represent an analysis of Iranian intention and attitudes towards the Middle East. In a test analysis, fragments were selected from open sources, but were gathered and signified by indexers sympathetic to the Iranian government. This landscape plots stability in the vertical axis, so that troughs represent stable areas, and peaks represent instabilities where the dynamic landscape can potentially reconfigure dramatically. By adjusting the control parameters related to the signifiers and their range of values, a researcher can gain understanding regarding where the tipping points in the system may lie. Large fluctuations may also indicate that a phase change may be approaching.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 shows exemplary deliberately ambiguated signification prompts in accordance with the present invention and illustrates the concept of opposing negative attributes;

DETAILED DESCRIPTION

A method and system is disclosed for signifying fragments or information objects, and is suitable for signifying a large volume of fragments, such that the signified fragments can be analyzed to discern patterns created by the signified fragments. Fragmented material ("fragments") arise in a variety of forms, including oral recordings, transcribed material, internet-centric sources such as YouTube® video, pictures or paintings, and the like.

Traditionally, the act of abstracting original material into a structured document or case study takes place in the context of a particular time and place. As those parameters change, the relevance of the abstracted material diminishes. Abstraction requires making choices about what is relevant and the level of understanding in the target audience. As a result, there is inevitable loss in the process, which may include the loss of weak signals or subtle clues. The price of codification is abstraction, and thereby loss—the value of codification is in rapid diffusion.

The most effective fragments for pattern-based cognition are: i) original materials, ii) of relatively fine granularity, and iii) where the key meaning(s) has not been already abstracted. Such fine-grained material may comprise one or two paragraphs of text, a single photograph, a YouTube® reference, etc.

Signifying fragments, or "signification," may include, but is not limited to common indexing or tagging. Typically, the process of signifying a fragment involves a human signifier, or indexer, who views the fragment and responds to a signifier prompt about that fragment. While the act of signification involves discovering meaning in the content of the fragment, it also involves adding layers of meaning to the fragment (particularly when the signifier created or chose the fragment in the first place).

Unlike traditional approaches, in a preferred embodiment of the present invention, fragments are signified (at least partially) in isolation from other fragments and a synthesis is done with the collection of signifiers and fragments, not with individual fragments. In this way, there is no longer a focus on the initial interpretation of information objects, but rather on interpreting meaning from the patterns created from the signification of the fragments. In effect, this combines qualitative and quantitative methods.

Figure 7:
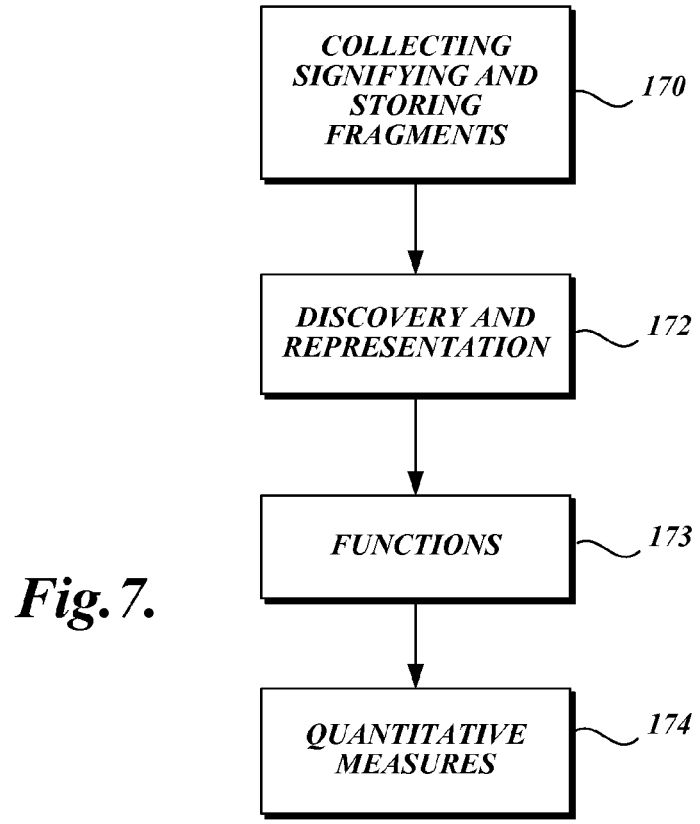
FIG. 7 is a flowchart showing an overview for implementing a CSA framework in accordance with the present invention.

The present goal is not only to utilize the rich context of narratives and other fragmented material of human interest, but also to create objective data in which cognitive bias is minimized and where reliance can be placed on the conclusions drawn. Referring now to FIG. 7, two components will now be described:

Collection, signification of the collected material, and storage of the collected material and any of their related signifiers 170.

Discovery and representation of patterns and insights within the signified fragments 172.

Subsequently, frameworks that incorporate these two components 170, 172 are introduced.

Collection, Signification, and Storage

Collection

Commonly, fragments come directly from participants (e.g., their own words either written or spoken), are selected by participants from other sources (e.g., newspaper articles, YouTube® videos, etc.), or are pre-selected by a third party from other sources.

EXAMPLE 1

Consider a method for studying and characterizing the impact of a museum visit on a group of students. Traditional tools for obtaining student impressions utilize questionnaires, focus groups, or expert interviewing, all of which have significant potential for introducing biased or erroneous conclusions. To avoid the shortcomings of traditional tools, a web site was created that the students could access. The students were asked two questions designed to elicit a story: 1) Tell a story about your friend's visit to the museum that would enable him to persuade another friend to go to the museum rather than play football; 2) Tell a story about your friend's visit that would persuade his parents not to take him to the museum, and instead allow him to play football with friends. Other questions could be used, but the general rules underpinning these prompting questions are simple:

The question should be formulated to capture a reflection on an experience (ideally the whole of the experience) and should be designed to elicit fragmented material.

The question should be asked in such a way as to elicit a meaningful context in the imagination of the subject.

The question should not privilege positive or negative experiences but should seek both.

The subject should be allowed to answer in the third person.

The purpose of a prompting question is to elicit fragments, not to gather interpretation or meaning. Suitable prompts may alternatively be instructions, for example: "Find a clip on YouTube that summarizes the attitude of management in this organization." The goal is to gather fragments that can then have layers of meaning added through the process of signification. The use of a web site, or a social computing environment such as Facebook®, has the advantage of anonymity and is free from the presence and consequent influence of a researcher.

There are a range of other methods that can be used to collect suitable narrative fragments, as are known in the art, for example, population sampling, participatory research and/or anecdote circles. Methods can of course be used in combinations, and with different types of prompts, including prompting questions, situations, pictures and/or videos. Generally, diversity in methods and participants is preferred.

Signification

The collected fragments are then signified. For example, fragments may be volunteered or selected by an indexer and self-signified, or a collection of pre-selected fragments may be presented to an indexer for independent signification.

There are two broad signification approaches commonly used today within the field: hierarchical classification (indexing) and tagging. Unconstrained tagging introduces massive uncertainty due to the imprecise nature of language, whereas rigid classification systems may be too static and non-adaptive. In recent years, attempts have been made to create controlled vocabularies in social computing environments. This has potential within a restricted population but is not practical for mass capture. Semantic and related approaches are also seeking to overcome these issues; however, it is believed that the herein disclosed use of humans to add layers of meaning through signification is novel.

A semi-structured signification approach is disclosed herein, one that could be created by the researcher if there are specific objectives, or for more general applications, through an emergent process using a sample of the population. Preferably, a mixture of signifier prompt types is utilized.

A novel method disclosed herein is to create deliberately ambiguated signification for abstract qualities, which allows the capture of the essential ambiguity of people's interpretation and meaning. A deliberately ambiguated signifier prompt is defined to be a prompt for signifying a fragment wherein the response is an indicated position along a one-dimensional or a multi-dimensional continuum having a plurality of labeled points. For one-dimensional deliberately ambiguated signifier prompts (e.g., scales), none of the labels, if selected, comprise a desired or expected response. The labels may be text, images, or other similar indicators having meaning to the user. As opposed to conventional indexing, which will only focus on the things expected, deliberately ambiguous terms or pictures are placed in tension with one another. An advantage of deliberately ambiguated signification is that it increases the cognitive interpretive load on the indexer allowing the recall of unexpected circumstances and additional context while shielding the results from the bias of prior assumptions and hypotheses. A key point is that indexers need to think more about their broader understanding of the fragments so that they are adding meaning when they signify the fragments, not just indicating meaning. It is from a collection of these ambiguous signifiers where often powerful and insightful meaning lies.

EXAMPLE 2

An example of a deliberately ambiguated signification process is to provide a linear scale having opposing ends that are both labeled with highly favorable or positive attributes, or both with highly unfavorable or negative attributes, and asking an indexer to mark the appropriate location for a particular fragment along the scale. For example, a desired or anticipated answer is identified and two end labels are provided as "the thing not present" and alternatively "the thing taken to excess". Marking the center of the scale might therefore represent a desired or anticipated answer. With such a linear scale with two end labels, a single input by an indexer produces two signifier values for analysis (the left hand label represents 100% of itself or 0% of its opposite).

A further specific example of deliberately ambiguated signification is indicated in FIG. 1, which uses a concept of opposing negatives. A set of signifier prompts 90 is given to a selected group, for example, employees or other stakeholders of an organization. For each of the signifier prompts 90 in this example, a linear scale 92 is provided with end labels 94, 96 that are designed to indicate opposing negative attributes, and the indexer signifies a fragment by marking the appropriate location for the fragment along the scale 92. The signifier prompts 90 may include a 'does not apply' option 98.

EXAMPLE 3

Another preferred method for generating deliberately ambiguated signification uses a visual representation, typically but not necessarily a two-dimensional shape, and requires the indexer to mark a response on the visual representation. For example, the visual representation may comprise geometric shapes (triangles, squares, etc.) with selected labels, or an object having some meaning to the indexer, e.g., a matrix, möbius strips, pictures, etc. This is referred to as a "multi-dimensional signifier prompt" and the captured result is called a "multi-dimensional signifier".

Figure 2:
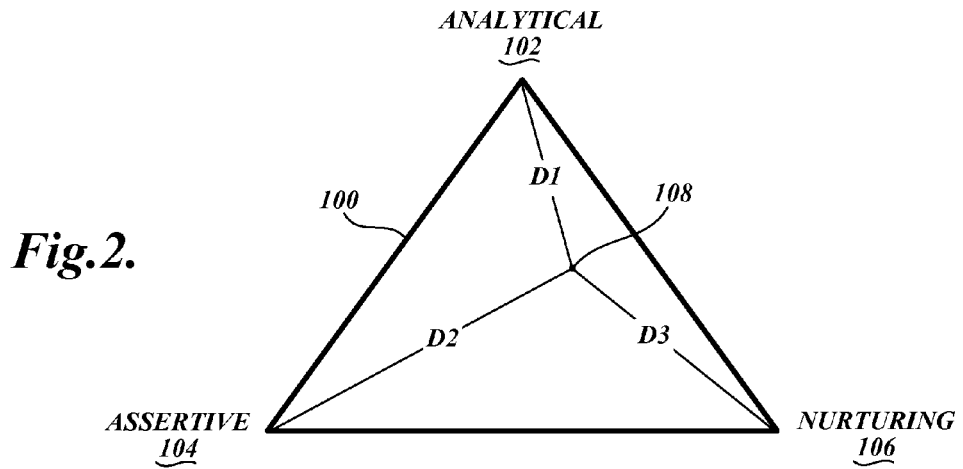
FIG. 2 illustrates a simple multi-dimensional deliberately ambiguated signifier prompt.

A multi-dimensional signifier prompt simplifies the signification input and provides richer data. FIG. 2 illustrates a simple multi-dimensional signifier prompt that might be used to signify fragments relating to management style or effectiveness. The multi-dimensional signifier prompt comprises a triangle 100 with three labels on each of the vertices: Analytical 102, Assertive 104, and Nurturing 106. An indexer reviews a fragment, and then selects a position 108 on the triangle 100 that best represents the particular fragment. The selected position or multi-dimensional signifier 108 is then associated with the fragment. With a single entry, therefore, three signifier metrics related to "Analytical", "Assertive", and "Nurturing" can easily be captured, for example, by measuring the distance D1, D2, D3 from the entry made by the indexer to each label.

Clearly, other metrics associated with the selected position may alternatively or additionally be used. For example, an analyst might discern relevance to a middle point between any two vertices on the triangle 100, and therefore a metric comprising the distance between the multi-dimensional signifier and the midpoints may be calculated and analyzed.

EXAMPLE 4

Figure 3:
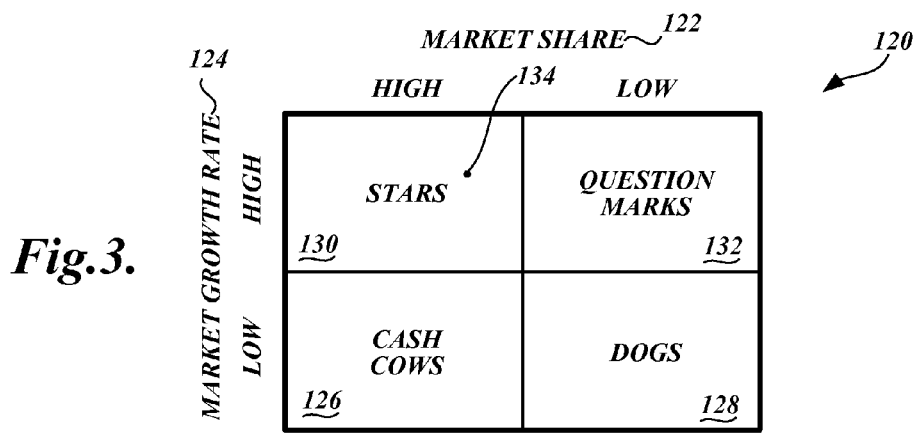
FIG. 3 illustrates another multi-dimensional deliberately ambiguated signifier prompt based on the BCG matrix.

Another example of a multi-dimensional signifier prompt uses a matrix, which may be custom designed for a particular application, or may draw on structures familiar to the indexer. For example, many business persons are familiar with a 2×2 matrix developed by The Boston Consulting Group, Inc. and referred to as the growth-share matrix or the BCG matrix. An exemplary BCG matrix 120 is shown in FIG. 3. A BCG matrix 120 has two axes, a market share axis 122 and a market growth rate axis 124. The BCG matrix 120 includes four regions or quadrants, conventionally referred to as the "Cash Cows" 126 (low market growth, high market share), the "Dogs" 128 (low market growth, low market share), the "Stars" 130 (high market growth, high market share) and the "Question Marks" 132 (high market growth, low market share).

An indexer familiar with the BCG matrix may be asked, for example, to signify a fragment by indicating its appropriate position on the BCG matrix 120, indicated in FIG. 3 by point 134. Linear scale signifier values, for example, may be extracted from the indexer's response by measuring the distance to selected points on the BCG matrix 120. Additionally using this same BCG matrix 120, a signifier value may be created that captures a response to a multiple-choice prompt (in this example, the response would be one of the four quadrants—"Dogs", "Stars", "Cash Cows" or "Question Marks"). Similarly, the capture of numerical values associated with the "Market Growth" and "Market Share" provide useful and analytically amenable signification. For multi-dimensional signification, any suitable shape may be used and may include regions that are both selectable and non-selectable to an indexer.

Figure 4:
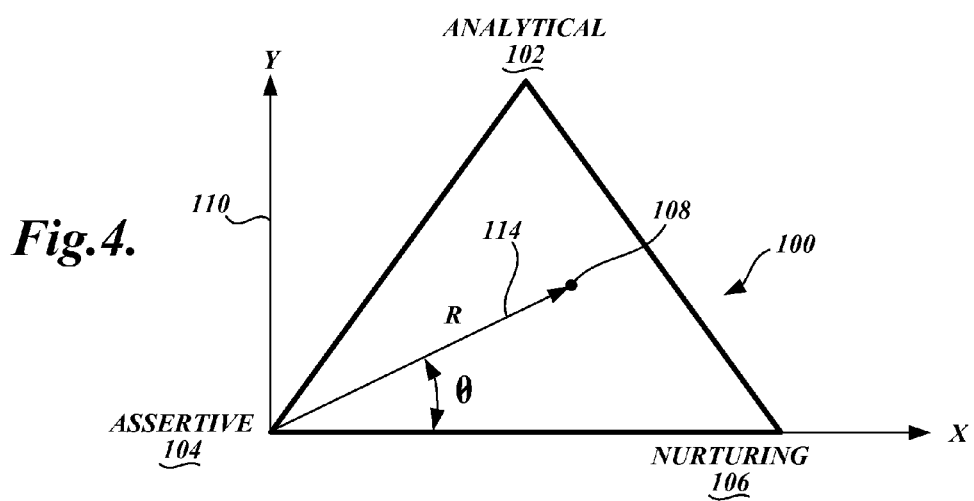
FIG. 4 illustrates a method for efficiently storing signifier values obtained from multi-dimensional signifier prompts.

In addition, the signification metrics may be changed or selected after the indexers' responses have all been obtained. For example, it may be determined after a preliminary analysis of the signified fragments that a particular metric provides particular benefits. By suitable storage of the multi-dimensional signifier input, the new metric may be readily calculated from data that has already been collected. FIG. 4 illustrates a currently preferred method for storing the signifier values collected, for example, from the multi-dimensional signifier prompt shown in FIG. 2, wherein an exemplary x-y axis 110 is shown. The example, signifier 108 may be characterized by a vector 114 with a length R and an angle θ, which indicates the signifier position 108 selected by the indexer. This vector 114 can be directly saved (e.g., R and θ) without the need to work out the specific signifier values (e.g., distances to the vertices 102, 104, 106, etc.) in real time. With knowledge of the particular multi-dimensional signifier prompt and the response vector 114 (or any other suitable representation such as its Cartesian coordinates), the derivation of any signifier value can be done later, or even re-done if desired.

For example, after initial fragment signification using a multi-dimensional signifier prompt, analysis may provide greater insight into a previously unknown position of great significance on the multi-dimensional signifier prompt. With that insight, the fragment signification for a large set of signified fragments can easily be re-done using the originally collected fragments and the saved raw vector positions. This additional flexibility also allows a multi-dimensional signifier prompt to be used for signification without doing pre-analysis to determine all significant points from which linear scales or multiple choice prompts can be derived; determination of significant points can be done after fragments are signified.

It is contemplated that researchers or experts in a field might develop a particular multi-dimensional signifying shape and labels, for example, that is suitable to a particular field of study. They might also provide an interpretive framework and body of knowledge specifically related to the multi-dimensional signifiers. Significant work of this type may be made available to other researchers, for example via open-source, while other work remains proprietary.

In regard to the labels on multi-dimensional signifier prompts or the end points of linear scales, there is significant flexibility. Labels may be words, pictures or anything of meaning to an indexer and may be positioned anywhere around or on the shape of a multi-dimensional signifier prompt. The number of labels on any particular signifier prompt is also flexible and meaning can be extracted from any label, inferred label, or any combinations thereof.

Figure 5:
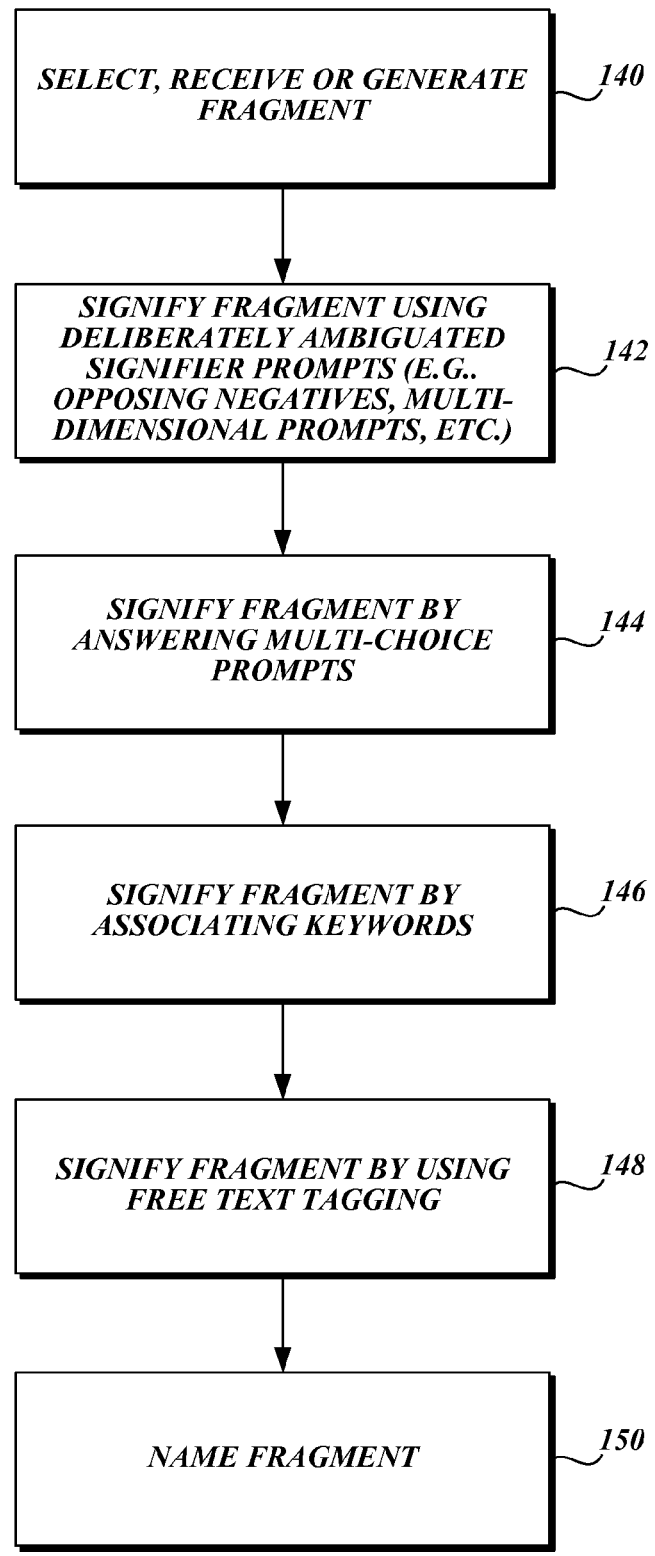
FIG. 5 illustrates a robust data signifier method for obtaining signifier values in a plurality of different modes.

As shown in the method flowchart of FIG. 5, the ambiguated signification examples discussed above may be supplemented with more conventional signification. In this example, the indexer first receives, selects, or generates a fragment to be signified 140. The fragment may then be signified using one or more of several methods, including one or more deliberately ambiguated signifying methods 142, such as those discussed above. In addition, multi-choice prompts (MCPs) may be used to capture aspects of the fragment 144 having limited ranges of options. Apart from demographic and other data, a range of MCPs has proved consistently useful over a range of projects. For example: "Why was the story told?" (to attack, to defend, to educate, to entertain, to influence, to inform, to uplift or unclear); "Was the story Sacred or everyday?" (this is normally elaborated in context); "What was the teller's relationship to the story?" (central character, reported by witness, hearsay or gossip).

Similarly, "Keywords" 146 may be associated, which allow standard capabilities such as tag clouds to be used to good effect. Any number of "free text" fields 148 may also be provided to allow additional signification. This can be particularly useful if the fragment to be signified is not text.

A further example of signification comprises the naming of a fragment 150, which can be highly significant and often contains more meaning than the content itself. Naming also allows for the original content to be kept private to its originator (essential in some projects) with access only granted by permission. The name on its own is enough to give the researcher or decision maker the opportunity to make sense of an overall pattern of fragments.

A typical approach for signifying a fragment may use a combination of the methods discussed above. For example, the indexer may be asked to name the fragment, and then respond to one or more linear scale prompts, multi-dimensional signifier prompts, and/or MCPs.

As the same fragment may be signified multiple times (e.g., by different indexers), it is often useful to capture signifiers specifically related to an indexer or a related group of indexers. For example, signifier prompts may be asked of the individual indexers regarding their general attitude or perception, and/or factual issues such as demographics. The indexer prompts are asked one time only (although amendment is permitted), and are then linked to all fragments signified by that indexer.

An exemplary signifier design process will now be described. When starting a project, finding the ambiguous qualities associated with the field or issue is the first priority. Multi-dimensional signification prompts and/or linear scales are then developed to address these ambiguous qualities. Next, the modulators associated with the field or issue are identified. Modulators are factors that have an influence on the evolution within the space. Modulators can be thought of as the magnets in a complex system. The researcher may identify all of the known modulators and then typically build linear scale signifier prompts (or multi-dimensional signifier prompts).

EXAMPLE 5

Using a leadership example, the assumption is that if leaders consult staff at the right level, staff will be better motivated. Therefore, "leadership consultation" becomes a modulator and the two extremes of a linear scale signifier prompt could be "Mechanical indifference" and "Loving everybody; big group hug" where the expected answer is the non-stated center point. For espoused values, linear scale prompts, multi-dimensional signifier prompts, or MCPs can be used. Finally for quantitative data, such as demographics, MCPs should be used.

Discovery and Representation

Software-aided discovery and representation 172 (FIG. 7) allow researchers to discover patterns in the collection of signified fragments. In a preferred embodiment of the present method, the researcher may detect a pattern based on a plurality of signifiers, and then seek greater understanding of the pattern by looking directly at the individual signifiers and/or content of the relevant fragments. The patterns are generated from analyzing the signifiers from a collection of signified fragments, and the researcher can then study the fragments relevant to a particular pattern. Signified fragments may be displayed in categories related to signifiers. For example, in an organizational setting, a cluster of signified fragments may be signified as indicating a resistance to change. An analyst could then review only the specific relevant fragments to determine the influencing factors of the pattern. Of course, frequency charts, linear scales, scatter plots and the like may similarly be used to display signifier patterns, and statistical metrics associated with the signifiers.

The signifiers may be represented or visualized with one or more landscapes, where individual points on the landscape represent signified fragments, and by selecting any point of the landscape, the raw fragment can be viewed. The landscape formed, with peaks and valleys, carries significant meaning.

EXAMPLE 6

Using landscapes in discovery and representation 172 allows researchers to represent belief systems that can support decisions on how to influence those beliefs to change and to modify them. When the stability of a system is being explored, the landscape is commonly referred to as a fitness landscape.

Figure 6:
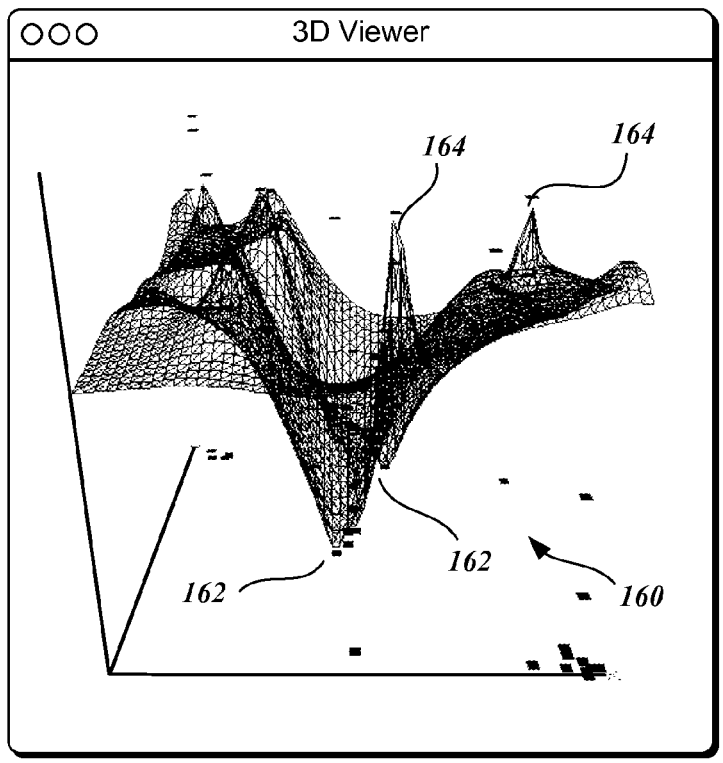
FIG. 6 illustrates an exemplary landscape for displaying signified fragments.

FIG. 6 shows an exemplary landscape 160 wherein the subject matter of the fragments and the signification may relate. For example, the landscape 160 may be used to represent an analysis of Iranian intention and attitudes towards the Middle East. In a test analysis, fragments were selected from open sources, but were gathered and signified by indexers sympathetic to the Iranian government. This landscape 160 plots stability in the vertical axis, so that troughs 162 represent stable areas, and peaks 164 represent instabilities where the dynamic landscape can potentially reconfigure dramatically. By adjusting the control parameters related to the signifiers and their range of values, a researcher can gain understanding regarding where the tipping points in the system may lie. Large fluctuations may also indicate that a phase change may be approaching.

The landscape 160 shows two strong attractors identified by troughs 162. Examination of the relevant underlying fragments indicates that one attractor is "anti-west", while the other is "anti-American". Attempts to shift or change attitudes by directly addressing those issues are likely to have little effect, and the message will quickly be interpreted to confirm the dominant and strong attractor. The opportunity lies in the flatter areas around the attractors where possibilities, for good or ill, are still open.

Subsequently, a number of new fragments were added, and a new landscape was generated (not shown). A new pattern emerged indicating a third attractor, representing an opportunity to change attitudes. This example illustrates the ability of representation 172 derived from pre-hypothesis research material to reveal weak signals that would otherwise be ignored. Rather than interpreting analytical data presented by experts, the direct interaction of the decision maker with raw material or fragments discovered from statistically significant patterns and anomaly detection will produce insights and a greater willingness to act.

By combining the above-described components in various ways and by adding additional capabilities where needed, three broad generalized frameworks will now be disclosed.

Collector/Seeker/Auditor Framework

As will be described, the Collector/Seeker/Auditor (CSA) framework has many capabilities to support improved decision making such as collecting and managing insights, seeking and managing opinions from large groups, and audit functionality (creating objective measures relating to human attitudes in areas of ethics, safety, loyalty, etc.).

Organizations often have difficulty interpreting the results of traditional questionnaires, as the results generally come without context or are the result of hypothesis-driven questions, which can lead to the creation of inappropriate or even dishonest interventions. In addition, the ability to "game" questionnaires or "gift answers" further weakens their practical use.

Focus groups generally obtain opinions from only a small number of people, and individual strong opinions can influence the entire focus group. Moreover, focus groups are time-consuming and expensive.

Interviews can suffer from interviewer bias, and are also time-consuming and expensive to run to get enough opinions to have statistically significant results.

Consulting expert groups is also problematic due to the difficulties in judging experts' actual competencies and biases and finding and consulting enough experts to have a statistically relevant number of perspectives to make a good decision. It's also well established that experts in a particular field often suffer from entrained thinking that can affect the quality of the results.

Refer again to FIG. 7, showing an overview flow chart for implementing a CSA framework comprising: i) collecting, signifying and storing fragments 170, ii) discovery and representation of patterns in the signified fragments 172, iii) developing transformational functions 173, and iv) calculating the resulting quantitative measures which interpret the signified fragments and their possible patterns 174. Where applicable, the information flows in the CSA framework will be described in two modes: instantiation mode and operational mode.

EXAMPLE 7

To demonstrate the CSA framework's collector functionality, fragments are collected by or from participants (e.g., employees), signified and stored into a database 170. The signified fragments may be generated, for example, using any of the methods discussed above. The participants may create their own fragment(s) or select from existing fragments, such as magazine articles, audio recordings or social computing resources such as Flickr®, YouTube®, etc. Ideally the participant, through a computer interface (including mobile devices), then immediately signifies the fragments. When a collection of signified fragments are collected, a process of discovery and representation 172 can be undertaken to identify, manage, and/or retrieve insights from this collection of signified fragments. For example, researchers may graphically analyze patterns in the fragments and/or signifiers for the fragments. As discussed above, signified fragments may be placed on a landscape or other graphical display based on the signifier data, allowing a researcher to identify relevant patterns and to view and focus attention on the most relevant signifiers and/or fragment content.

Discovery and representation 172 of these signified fragments could be used to identify important signifiers, combinations of signifiers, and/or other patterns of significant meaning as part of the CSA framework's auditing functionality. From the results of this analysis 172, functions 173 can be created to transform the signified fragments into quantitative measures 174 reflecting derived human attitudes (e.g., a risk aversion index). The selection and/or creation of transformational functions to produce quantitative measures is a relatively straightforward process and well within the skill in the art. The particular selection of transformational functions will depend on the particular application and the goals of the researcher. Various statistical and other analytical tools are available to aid in transforming large sets of data.

Each transformational function 173 requires one or more signifier value as an input, and the output, a quantitative measure 174, is calculated based on a mathematical or logical function operating on the input(s). Once the CSA framework has been instantiated, a baseline performance is established. The CSA framework can then be utilized in operational mode for continuous auditing, allowing decision makers to identify subtle changes in the quantitative measures 174.

In a preferred embodiment, additional fragments are collected, signified, and stored into the database 170 and new quantitative measures 174 are calculated based on the new signified fragments and the transformational functions 173 defined during the instantiation mode. The quantitative measures calculated for the new signified fragments are compared with the original baseline performance (or a benchmark group performance), which can provide real-time monitoring and early warning detection. For example, if a particular quantitative measure 174 exceeds a predefined set-point, an early warning alert could be activated informing the administrators to investigate and/or take appropriate action.

For clarity, some examples of early warning detection may include:
- A manager's trust signifier with her subordinates has plummeted from 74% to 53% leading to dissatisfaction amongst her subordinates (satisfaction signifier reduced from 89% to 71%). Further analysis of the fragments indicates that the manager became aggressive last month, bulldozing through issues. At the same time, this manager was successful in convincing her superiors that she lacked a skilled/capable team and her ratings remained steady with her superiors, demonstrating her exceptional ability to manage upwards but not necessarily downwards; or
- Due to huge internal pressure to meet next quarter's financial projections, traders have become 32% more aggressive resulting in greater risks being taken and greater potential for improper behavior such as "rogue traders".

When an early warning is tripped and further detailed analysis is warranted, investigations through discovery and representation 172 may provide greater clarity and insight. At any time, an administrator is free to use discovery and representation 172 to further explore signified fragment patterns and representation leading to possible further insights.

EXAMPLE 8

In another example, consider a water utility company that captures rich narrative day-to-day experiences of engineers while they are in the field fixing pipes. The engineers record their impressions and signify the fragments 170 through a computer interface, as each project or sub-task is completed. The captured signified fragments are collected into a growing contextually relevant knowledge database that can be reused at any time in the future (e.g., by other engineers working in the same location in the future). With well-designed signifier prompts, the company can also optionally monitor, in real-time, the stream of signified fragments for quantitative measures 174 of employee satisfaction, attitudes to safety, ethics, etc.

The auditing capability of this method provides managers with quantitative measures 174 and the ability to selectively view signified fragments in raw form, to better understand any anomalies encountered.

The present methods can also be used as a powerful tool to help manage the process of staff development and can also be used in organizations or teams as a social computing tool to collect and signify fragments 170 as part of employees' normal work. This can lead to surprise patterns 172 and innovation potential while in parallel, and help to codify aspects of an organization's knowledge base with the possibility of providing a method to monitor human attitudes with quantitative measures 174. Similarly, these methods can be applied as personal productivity and personal knowledge management tools.

The present methods may also be applied to living oral histories, whereby key beliefs, language, ways of life, and the like are captured and signified 170 allowing later generations and/or researchers to investigate 172 a database of fragmented material encapsulating cultural norms in a much richer form.

As a variation to participants volunteering fragments, administrators may pre-select fragments for participants to signify. This approach illustrates the CSA framework's capability to seek opinions, or more broadly, opinions, perspectives, beliefs and/or values. Ideas, through the fragments presented, can be pre-tested in a population group without having to commit to a specific action. This provides a form of mass consultation, and can be conducted without revealing the objective of the consultation. It also builds on the body of work demonstrating the value of distributed cognition as each person is making a judgment independent of any other person, thereby allowing administrators to place higher confidence in the statistical results. A program of periodic signification provides a mechanism for routine mass consultation. Moreover, the fragments may include issues that are not of particularly high priority or relevancy. In this way, it is easy to consult on an important issue without unduly raising organizational anxiety.

This method to seek opinions may also be used to seek mass input from consumers, for example using a kiosk or online portal to solicit consumer input. Potential applications include museums, parks, sporting events, entertainment, online services, and products whether online or from traditional retailers. In a political context, the present method may be used by politicians campaigning to better understand the wishes of the populace or by governments to pre-test policy ideas. It will be readily apparent to persons of skill in the art that the disclosed method can be readily applied to many other fields, such as project management, and the like.

EXAMPLE 9

The methods disclosed herein to seek mass opinions may also be applied to an additional auditing approach where the primary focus is to monitor changes in attitudes that might lead to serious injury or death, significant damages/losses to assets, and/or significant legal liabilities. To begin such an audit, a database of paradoxical fragments is identified or generated. Paradoxical fragments are typically hypothetical fragments and may include, for example, questions, elections or anecdotes, wherein any response to the paradoxical fragment is "wrong" or undesirable in some sense. This ensures that the system is difficult to game as there is no "right answer". For example, such a fragment could be: "You are CEO of a petroleum company and one of your employees discovers a method for producing energy from seawater, for which there is no way of making a profit." A selected group may then be presented with a linear scale signification prompt such as: "What do you do?" On one extreme of the linear scale is: "Schedule a press conference to tell the world of the exciting discovery." and on the other extreme is "Schedule a meeting with your senior staff to develop a strategy on how to suppress this discovery."

Paradoxical fragments and signification prompts are distributed to statistically significant sample sets of a population on a regular basis. By selecting a number of different sample populations and rotating the signifying task among the different populations, any one person may be requested, for example, to signify fragments once every few months, while audit samples are obtained as often as desired (e.g., every day, week, or month, etc.). Quantitative measurements 174 can then be produced based on the signified fragments to indicate the shifts in the way the signification 170 is going on over time. The quantitative measurements 174 represent statistically derived attitudes or outlooks and may be matched against baseline results or a benchmark group. Wherever there is a lack of reliable quantitative methods for monitoring human behaviors, there is a potential application for this auditing function. Some additional auditing applications include variable rate professional indemnity insurance and satisfaction of the requirements of the Sarbanes-Oxley Act, for example.

It will be readily apparent to persons of skill in the art that the described methods have significant flexibility in their use. For example, while using the CSA framework to seek opinions or audit human values, the CSA framework's collector functionality can be initiated at any time such that: while requesting opinions regarding a significant corporate issue, participants may be prompted to provide associated fragments (e.g., stories) related to the issue in question.

Modeler Framework

Recent cognitive research suggests that the human brain processes experiences and stores complex patterns of the person's understanding of these experiences so that they can be used to interpret future events. The complex patterns are not knowledge, information, or data—these patterns are something different. These patterns are used to process incoming information objects to facilitate almost instantaneous decisions, seemingly without conscious consideration. These pre-processed patterns enable very rapid decision-making.

The modeler framework described herein similarly builds complex human-created patterns into a cognition system, resulting in enhanced decision-making when new information objects comes in, virtually without delay of interpretation. Although designed to be of great utility for CAS, the modeler framework has potential utility for any system type and may be applied to: i) capturing and redeploying knowledge, insights, and experience; ii) monitoring and weak signal detecting; iii) hypothesis testing; and/or iv) assisting with real-time insights from a large volume of fragmented information.

Typically, human decision making relies on a wide variety of ad-hoc approaches, wherein individual decision making relies heavily on limited human memories and experiences. More recently, online search engines such as Google®, Live Search® and the like enable decision makers to generate large volumes of information objects, frequently overwhelming the decision making process. Systems have been developed that attempt to organize such information objects, but such structured processes have had limited success in dealing with the inherent complexity.

A method for capturing human experiences, knowledge, and insights into a computer system so that they can be reused will now be described. Using such a system, decision makers can save time and effort, as they only need to review fragments that have the greatest probability of being relevant to their current issue and/or context. In addition, a contextually relevant visual representation is disclosed that provides a rich environment for strategic conversations.

The modeler framework will be described in two steps: (1) instantiating the model and (2) deploying the model. Once instantiated, a model contains both a visual model template, wherein locations on the template have inherent meaning (e.g., the BCG matrix, FIG. 3), and a plurality of fragments that are positioned on the visual model template at appropriate locations wherein each fragment is judged to characterize or exemplify the meaning of its particular location. Such fragments are referred to as exemplar fragments, or simply exemplars. The usefulness of a model increases with an increasing number of exemplars. At minimum, in a currently preferred embodiment, a model would contain at least one thousand exemplars but more ideally, the number of exemplars should number in the tens of thousands or more.

Figure 8:
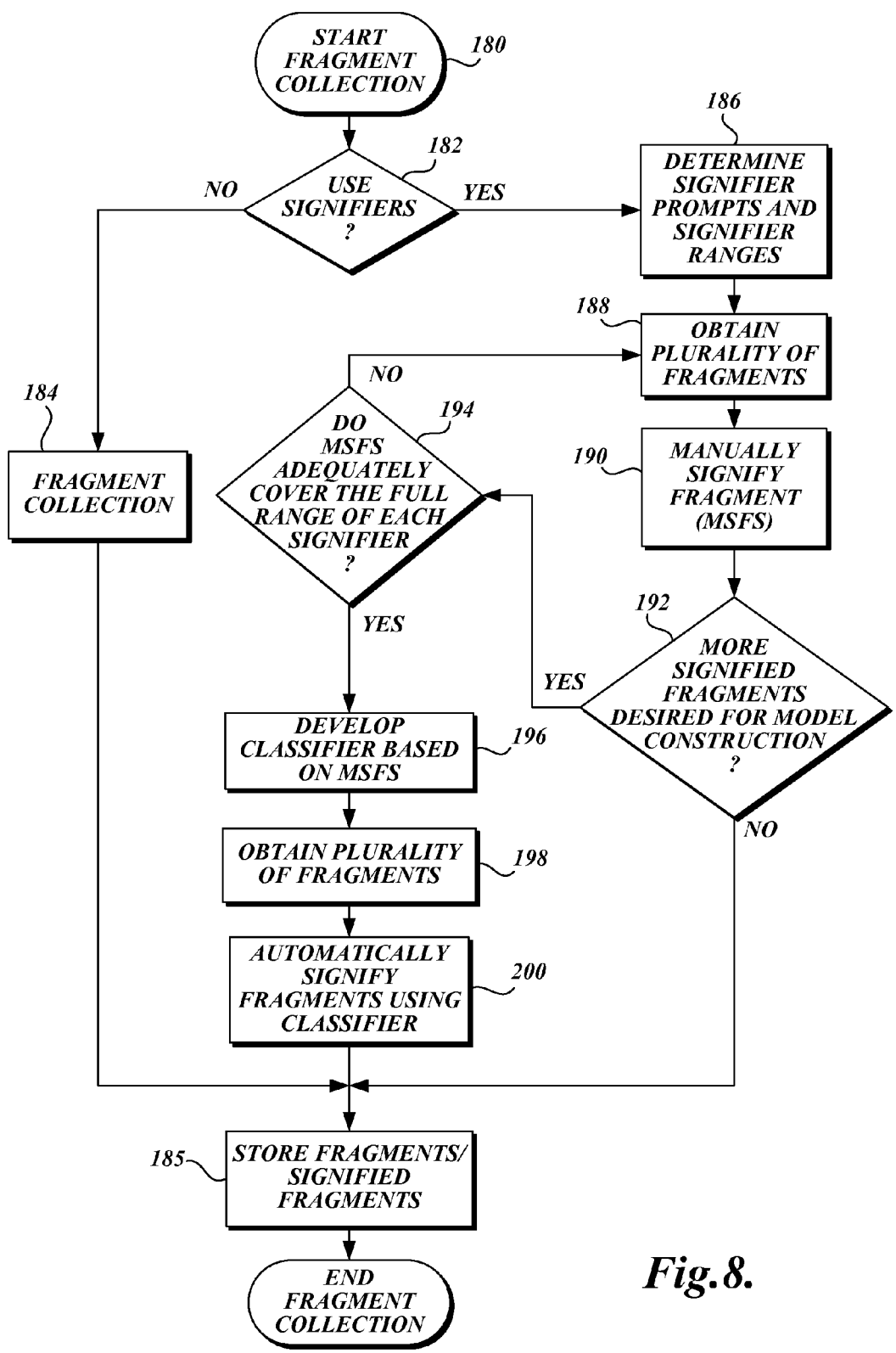
FIG. 8 is a flowchart illustrating a method for collecting fragments.

To instantiate a model, a source of fragments, and optionally their related signifiers, is required. Refer now to FIG. 8, which illustrates a currently preferred method for collecting fragments 180. The model developer first decides whether signifiers will be used 182. If signifiers are not used, fragments are simply collected 184 and stored 185. If signifiers are used, fragments must be collected, signified, and stored. In this preferred embodiment, the developer determines the signifier prompts that will be used, and a desired range of signifier values 186 is determined for each signifier prompt. Fragments are then obtained 188, for example, by any of the methods discussed herein, and the obtained fragments are manually signified 190 by an indexer, as discussed above. Fragment collection and signification continues until sufficient fragments have been signified for model construction, or it is determined that it would be useful to automatically augment the number of signified fragments used to instantiate a model 192.

In some applications it is desirable to augment the manually signified fragments using known automated techniques (e.g., classifying). The developer and/or computer decision support algorithms must first determine if the signified fragments adequately cover the full range of each signifier 194. If more manually signified fragments are desired or needed, then the process of obtaining fragments 188 and manually signifying fragments 190 is repeated. When it is determined that the collection of signified fragments adequately covers the full range of each signifier 194, a classifier may be developed based on the manually signified fragments 196, so as to be able to automatically signify additional fragments, as discussed below. Additional fragments are then obtained 198, for example by any of the methods discussed herein, and the additional fragments are automatically signified 200, using the classifier. All signified fragments are then stored 185. Suitable classifiers are known in the art, and may use any of a variety of methods, including for example expectation maximization, co-training and support vector machine methods. Exemplary classifier methods are disclosed, for example, in U.S. Pat. No. 7,366,705 and in U.S. Patent Publication No. 2004/0199375, both of which are hereby incorporated by reference in their entirety.

A classifier is provided with a sample set of manually signified fragments, generally referred to as the training set. The classifier uses the training set to develop or parameterize mapping algorithms from which it can automatically signify additional fragments. The new fragments can then be signified in a manner similar to the training set. To reliably reflect the original signification, a balanced training data set is needed, typically requiring hundreds of manually signified fragments, and more preferably, thousands of manually signified fragments that are distributed over the full ranges of all the signifiers. As noted in the references incorporated above, there are many approaches to classification known to the art and this remains a fertile area of continuing research. Although any suitable classifier may be used in the modeler framework disclosed herein, it is believed that the use of a classifier in the modeler framework disclosed herein is novel.

Figure 9A:
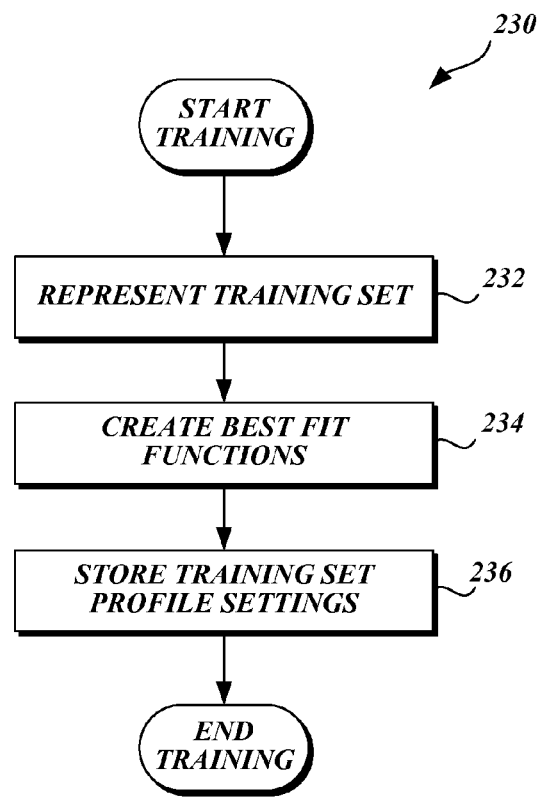
FIGS. 9A-9C are flowcharts illustrating classifier operation methods.

An exemplary overview of a suitable classifier methodology will now be described with reference to FIGS. 9A, 9B and 9C. FIG. 9A illustrates a method for training a classifier 230 wherein a training set is first represented 232, which means a plurality of "concepts" are identified, and suitable algorithm settings are determined and stored, as are known in the art. A highly optimized version of dimensionality reduction has demonstrated strong abilities uncovering contextual relationships between previously unassociated terms and documents; however, any suitable algorithms can do this representation. Best-fit functions are then created 234 and the training set profile settings are stored 236. This is accomplished using standard machine learning algorithms known to the art. A best-fit analysis is done which establishes a set of machine learning settings that allow inputs (e.g., "concepts") to be mapped to outputs (e.g., signifiers). Once all the settings are stored 236, a classifier is effectively trained.

Figure 9B:
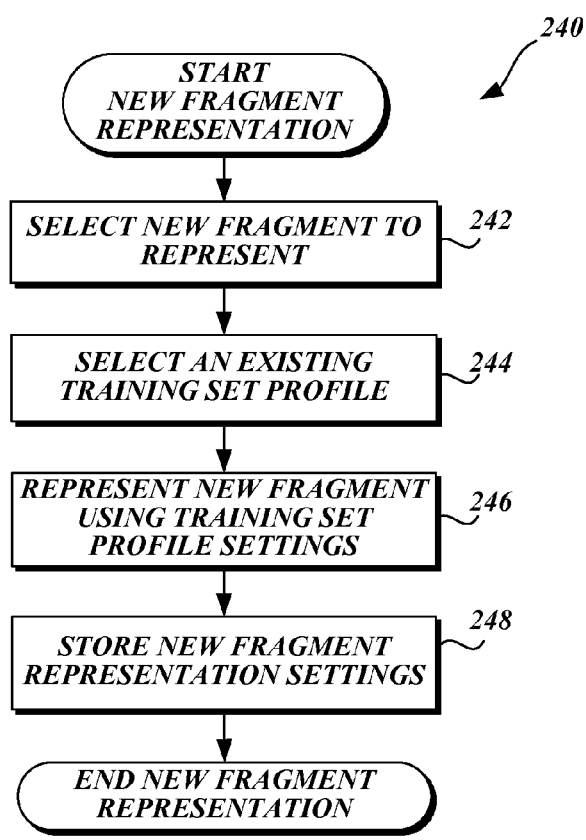

FIG. 9B illustrates a method 240 for using a trained classifier to automatically represent a new fragment. In this example, a new fragment 242 and trained classifier 244 are selected, and the new fragment is represented 246 in a compatible representation to the training set 232. The new fragment representation settings are then stored 248.

Figure 9C:
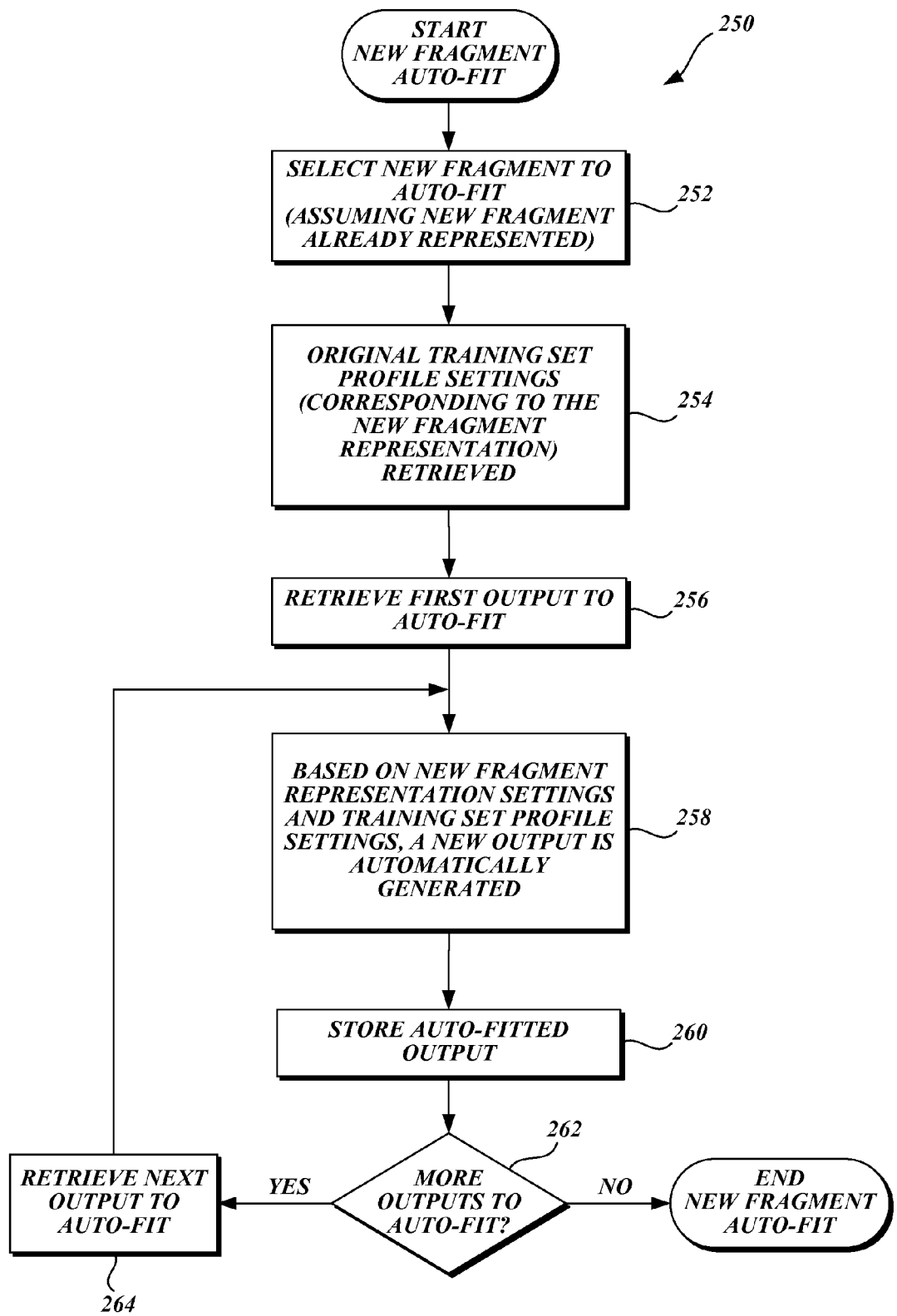

Referring now to FIG. 9C, once a new fragment has been represented, suitable signifier values can be automatically generated 250. The new fragment is selected 252 and the original training set profile settings (corresponding with the new fragment representation) are retrieved 254. The first signifier value to be automatically generated is selected 256. Based on the new fragment representation settings and the training set profile settings, a new signifier value is automatically generated 258 based on the best-fit function established during the original training of the classifier. The signifier value is stored 260 and if more signifier values are desired 262, the next signifier is retrieved 264 and the process is repeated.

Figure 10:
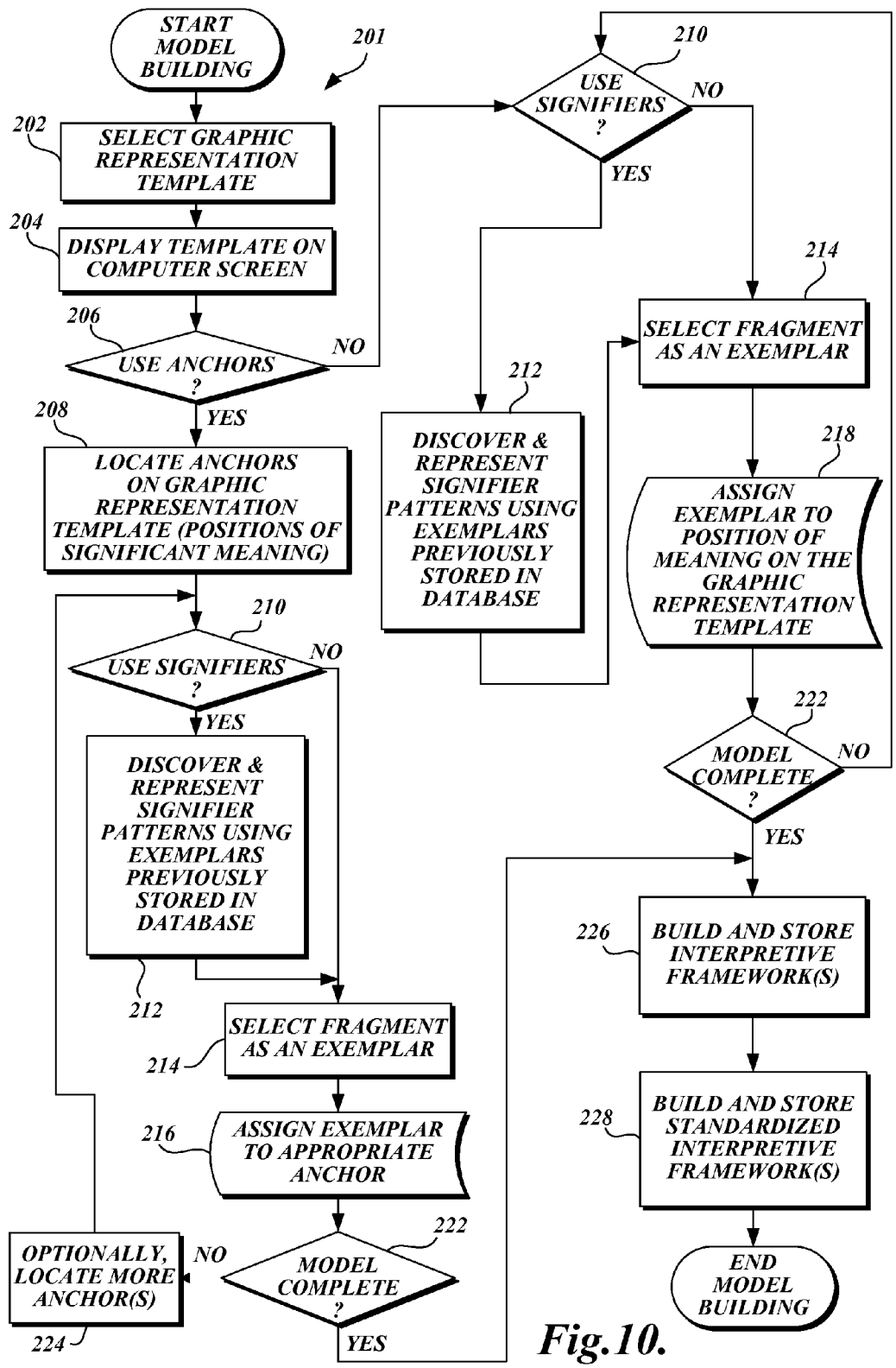
FIG. 10 is a flowchart illustrating a method for instantiating a model in accordance with the present invention.

Referring now to FIG. 10, a currently preferred method for instantiating or building a model 201 will be described. First, a suitable visual model template is selected 202. For example, a knowledge worker may select a BCG Matrix as a suitable template (see FIG. 3). Of course, any other suitable visual model template may be used, including for example models similar to the multi-dimensional signifier prompts discussed above. A visual representation of the uninstantiated model is then displayed on the computer monitor 204. By its definition, the selected visual model template provides a mechanism for indicating or ascertaining meaning. In a two-dimensional model, the meaning may be inferred by a particular location on the two-dimensional model. For example, referring again to FIG. 3, a BCG Matrix 120 has two axes 122, 124 and four quadrants 126, 128, 130, 132 that have well-understood meaning to users.

Returning again to FIG. 10, the knowledge worker then decides if anchors will be used 206. An anchor simply locates a position on the visual model template. In practice, the number and position of anchors may be arbitrarily selected. For example, the knowledge worker might determine the boundaries between regions are also of importance, and therefore include anchors at the midpoints of the region boundaries. If anchors are to be used, anchors are positioned at meaningful locations on the model template 208. In the example of the BCG matrix model 120, a knowledge worker might place four anchors in the middle of each of the four regions 126, 128, 130, 132.

The knowledge worker then decides whether to use signifiers in the model construction 210. Typically, signifiers are not used if the source of fragments being used to build the model does not contain signifiers or the knowledge worker elects to ignore fragment signifiers.

If signifiers are to be used in the model construction, the knowledge worker decides whether to use discovery and representation 212, which is generally the same as the discovery and representation 172 discussed above, to discover patterns in the collection of signified fragments. The insights gained from discovery and representation 212 may be used to help instantiate the model by helping to identify signified fragments 214 that exemplify a position of meaning on the model. If anchors are used, when a fragment is selected 214, it may be assigned to the appropriate anchor 216. These exemplars now define the anchor and the meaning of an anchor comes from its associated exemplars. The richness of meaning in an anchor correspondingly increases as more exemplars are added. This process of selecting and assigning exemplars is repeated until the model is determined to be complete 222. Optionally, more anchors 224 can be located on the model interactively.

If anchors are not used, the fragments selected as exemplars 214 are directly assigned to a position of meaning on the visual model template 218.

It will be apparent to persons of skill in the art that there are related modes of operation that are not explicitly outlined above, and that there are logical variations within the spirit of the present invention. For example, it is contemplated that users or indexers may be presented with various fragments and a model template, and requested to locate a position on a model template that best represents the meaning of each of the fragments. The plurality of fragments positioned on the model template comprises a multi-dimensional signification of the fragments, but may also be interpreted or analyzed to comprise a model as discussed above. In this scenario, even though the indexers are signifying the fragments, and not knowingly building models, a knowledge worker may directly use the collected multi-dimensional signifiers to define a model.

Figure 11:
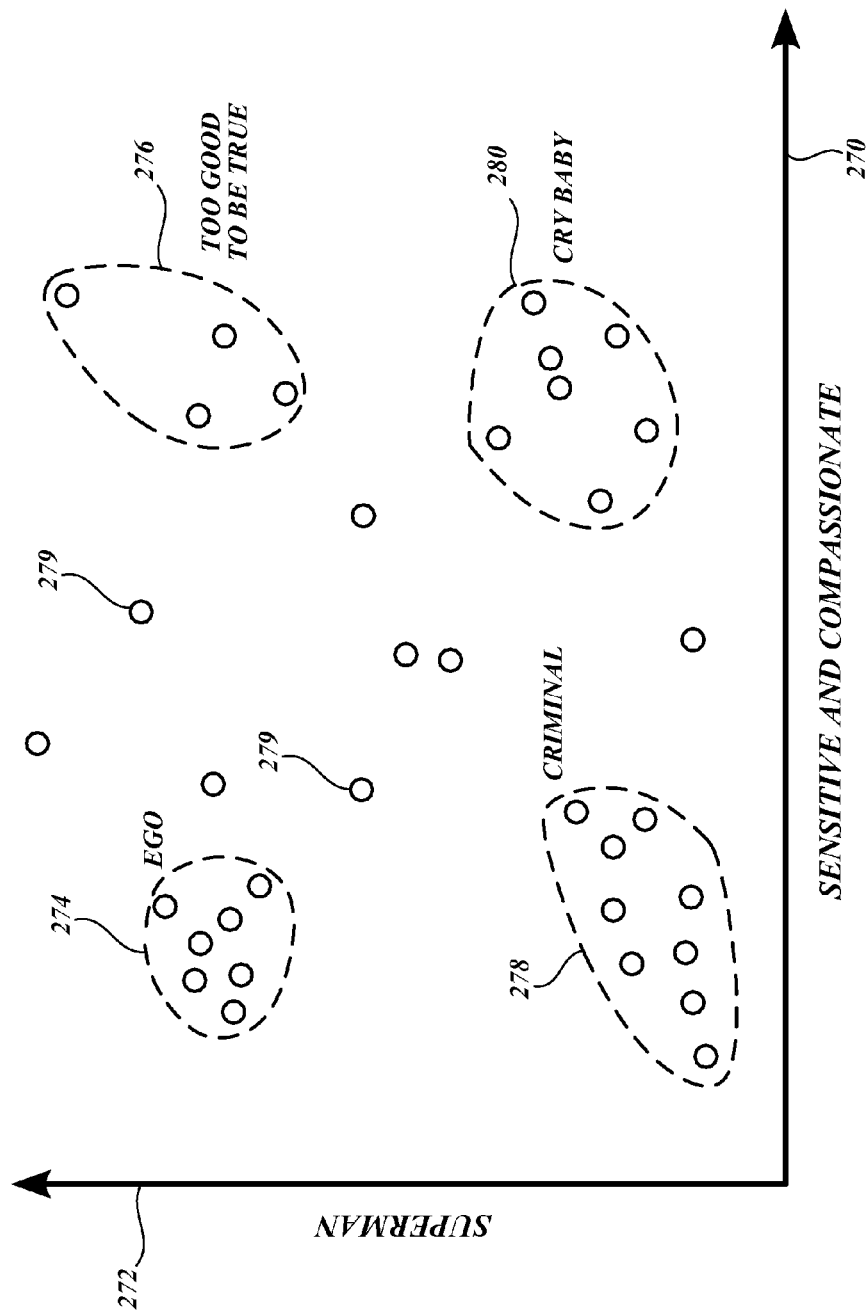
FIG. 11 schematically illustrates a model for displaying fragments to identify clusters and exemplars.

An alternative method to instantiate a model is to define one or more axes on an uninstantiated visual model template based on one or more signifiers, or a Boolean combination of signifiers. For example, supervisors might be characterized on the basis of various perceived character attributes. FIG. 11 schematically illustrates a model having a first axis with a scale composed of two signifiers and labeled "Sensitive AND Compassionate 270", and a second axis labeled "Superman"

272. The model framework could automatically position selected signified fragments on the model based on their signifiers and their relationships to the axes 270, 272. A knowledge worker could then edit this representation, for example by manually identifying clusters and providing suitable labels to the clusters, for example, "Ego" 274, "Too Good to be True" 276, "Criminal" 278 and "Cry Baby" 280. Outliers 279, such as signified fragments outside of the clusters 274, 276, 278, 280 might be deleted to create a final instantiated model composed of four anchors corresponding to the identified clusters 274, 276, 278, 280. It is important to understand that the meaning contained in a model is defined by the anchors and the attributes of the anchors are derived from the exemplars (or in the case where anchors are not used, the model is simply defined by its exemplars and their positions on the representation). When a new fragment is introduced into an instantiated model, its automatic placement may depend on a number of its signifiers relative to a composite of the anchors' signifiers. Consequently, the new fragments' positions may not be directly related to the axes 270, 272 that were used to originally identify the clusters 274, 276, 278, 280.

To illustrate the utility of an instantiated model, and more specifically anchors, assume a model is instantiated using anchors and signifiers. A newly signified fragment is introduced into the model, and its signifiers may be compared to the composite signifiers of the exemplars defining the anchors. The new signified fragment will be attracted/repelled to similar/contrasting anchors, thereby automatically aligning itself on the model in context of the anchors based on simple distance formulas or the like. A knowledge worker can use this environment to explore signified fragment patterns in relation to anchors leading to possible further insights and/or the interactive creation or modification of anchors (for example, modification could be human initiated or done automatically by the computer based on pre-set algorithms).

In practice, it is preferable that the modeler framework additionally uses fragment content when automatically aligning new fragments onto the model (e.g., keywords and/or some more advanced semantic algorithms able to abstract some meaning from the fragment content such as with the use of classifier methods herein disclosed). There is virtually no limit to the types of algorithms that can be use to align fragments on a model to achieve this result.

Referring again to FIG. 10, after instantiating the model, a knowledge worker can optionally create an interpretive framework 226 so that people unfamiliar with the model can more easily interpret the meaning of fragments positioned on the model during deployment. An interpretive framework 226 essentially documents the model providing a human readable "instruction manual."

In addition, the knowledge worker can optionally create a standardized interpretive framework 228, which is similar to interpretive framework 226, except it is a computer readable file. The standard interpretive framework 228 provides a structure for the computer to automatically interpret the meaning of fragments positioned on the model during deployment, by associating model location to human meaning. For example, if a fragment is located within a specified region on the model, the associated human meaning could simply be a text string such as "High potential for disruptive innovation." The standardized interpretive framework 228 is provided in a computer-readable pre-defined format, for automated computer interpretation.

We now have a model embodying knowledge that has effectively captured human meaning and context in a visual representation ideally suited for richer human interpretation. These models, once stored, are codified and redistributable so others can use them, either through purchase or open-source. The models are flexible in the sense that they can be adapted in any way, such as changing the positions of anchors, adding/deleting exemplars, and the like.

Figure 12:
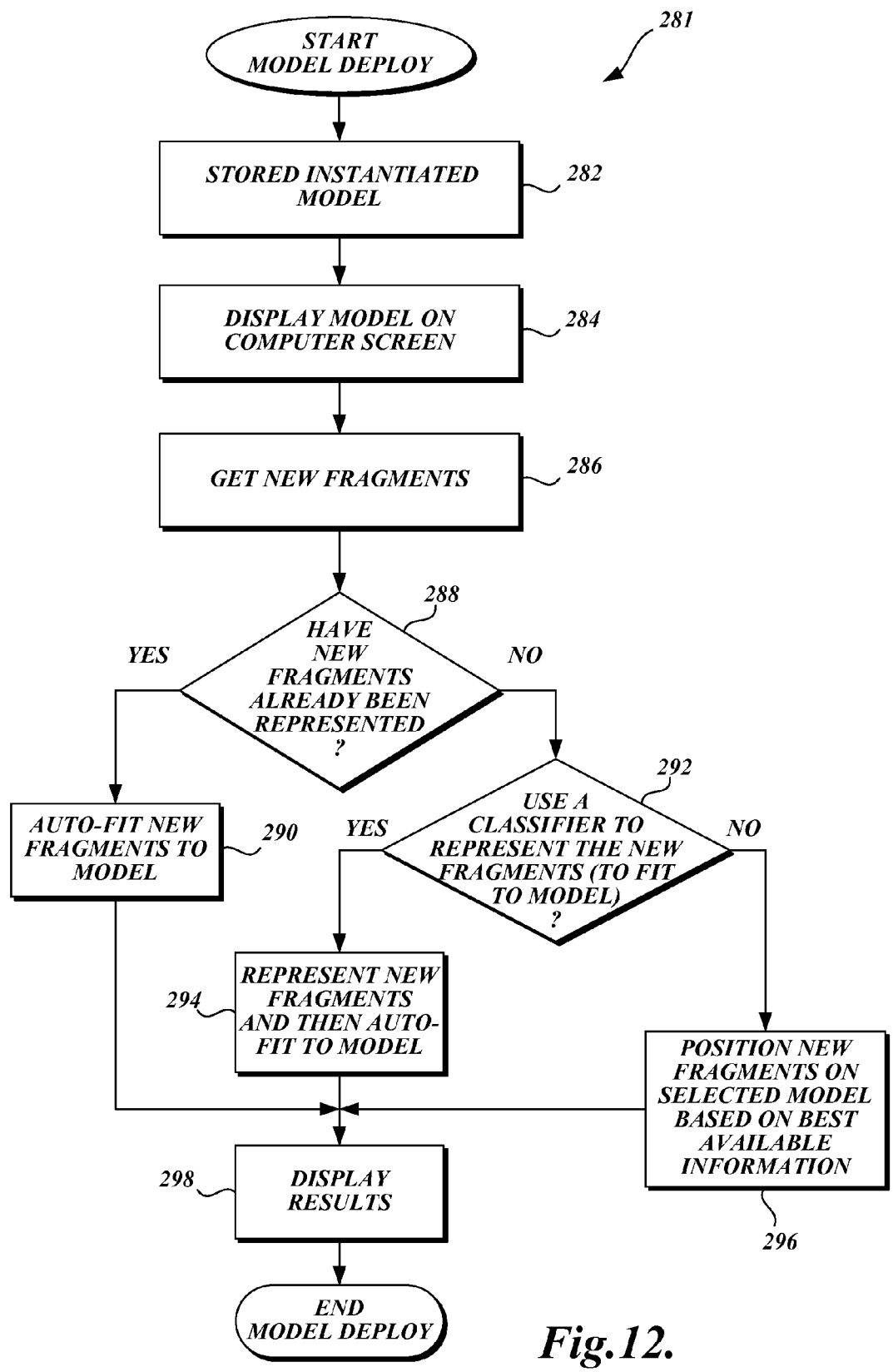
FIG. 12 is a flowchart illustrating a method for deploying a model according to the present invention.

Referring now to FIG. 12, deployment of the modeler framework 281 will be discussed. In deployment (and with one or more models instantiated), a knowledge worker selects a stored model 282, which is then typically presented on a computer display 284. New fragments are retrieved 286, for example, fragments obtained from any of the methods discussed above (see FIG. 8). The new fragments are then automatically positioned on the selected model. For example, if a fragment has already been represented 288 (e.g., if the fragment has been represented so that it shares a compatible representation as the model) then the fragment may be easily fitted to the model 290. If the fragment has not been represented 288, the system must first make a determination of whether to use a classifier to fit the fragment to the model 292. This determination will primarily be related to how much available time and/or computer resources are available to do the fragment positioning on the model. As a classifier needs to represent each new incoming fragment, this will be more time consuming and computationally intensive than fitting without classification. Assuming a classifier is selected to represent the new fragment 292, a trained classifier 294 similar to the classifier discussed above (see FIG. 9A-9C) will first need to represent the fragment 240 and then automatically position the fragment on the model 250. If a classifier is not selected 292, the new fragment is positioned on the model based on best available information on the incoming fragment 296 (described in more detail below). The results are displayed 298 on the selected model to the knowledge worker, for further interpretation and/or analysis.

Regarding how new fragments can be retrieved 286, it will be appreciated that in the simplest case, new fragments may exist in a stored database and a knowledge worker simply selects the fragments to retrieve.

Another example is to generate fragments by searching a fragment source (e.g., corporate intranet, the internet, etc.) using a third party search engine known to the art. Examples of types of search requests include:

A knowledge worker may provide a search string, which is sent directly to a third party search engine to generate a list of search results; or A selected area on the model (e.g., an anchor or a cluster of exemplars at or near a specified location) can be selected to effectively initiate a search with a focus on finding similar fragments as the exemplars at or near that location. A variety of algorithms known in the art could accomplish this; for example, a Boolean search string could be built from extracted meaning/context from the composite of exemplars and/or possibly the semantic meaning of that location in the model (in the simplest case, the extracted meaning could be the most common keywords in the selected exemplars). The search string could then be sent to a third party search engine to generate a list of search results; or A knowledge worker can enter a search string that is combined with meaning/context (as described in the above bullet point) from one or more anchors and/or clusters of exemplars or the like. This composite search string could then be sent to a third party search engine to generate a list of search results.

As another example, consider searching a fragment source that has been pre-indexed so that all the fragments are represented in a format compatible with the internal representation of a selected model. FIG. 9B illustrates how a new fragment can be pre-indexed (represented) using a classifier's new fragment representation capability. Then, with a database stored with indexes relating to each fragment in the fragment source, consider some different types of search requests:

A particular area on the model (e.g., anchor or a cluster of exemplars at or near a specified location) can be selected to effectively initiate a search with a focus on finding similar fragments as the exemplars at or near that location. More concretely, "search indices" are created from the composite representation of the exemplars' indices in that anchor/cluster. In addition, the search indices may also contain some interpreted semantic meaning based on the location of the anchor/cluster on the model. The response to such a search request is new fragments from the pre-indexed fragment source with indices having the greatest similarity to the "search indices"; or Instead of just a selected part of model initiating a search, it is contemplated that the entire model (all the exemplar indices and the locations of the exemplars on the model) could be the representation that is used to initiate a search of the pre-indexed fragment source; or A knowledge worker can also enter a search string and the search string is combined with either of the above two bullet points to provide greater context to the search request.

With new fragments retrieved 286 from a fragment source, if the new fragments have been pre-indexed (represented), the new fragments can be directly auto-fitted to the model 290 using the classifier methods illustrated in FIG. 9C. Some of the key differences in this use of the classifier to automatically locate fragments on a model (versus the automatically signifying fragments) are:

The output is "Similarity to each anchor/cluster" instead of "signifier"; and

The representation may include signifiers in addition to "concepts."

Therefore, significance levels of similarity of the new fragment to each anchor/cluster are calculated and from these significance levels, the location of the new fragment on the model can be calculated via various standard algorithms.

If the new fragments have not been already pre-indexed (represented), the system must determine if a suitable classifier is available and if the classifier should be used to represent the new fragments to fit them on the model 292. If a classifier is selected, this becomes a straightforward classification problem whereby each new fragment is first represented (see FIG. 9B) and then auto fitted to the model (see FIG. 9C). If the classifier is not selected, the new fragment is positioned on the model based on best available information 296: possibly its content, possibly its signifiers, and/or possibly a position on the model that helped generate the search.

In the simplest method to display the results 298, the visual model template is displayed and the new incoming fragments are overlaid on the template. If using the standardized interpretive framework 228, the computer could compare positions of the new incoming fragments on the model to areas of significance described on the standardized interpretive framework 228. The computer could prioritize the search results in a list starting with most significant. With each search result in the list, the computer can also optionally associate the human meaning (e.g., a text description from the standardized interpretive framework 228).

It is contemplated that many models may be developed that would have applicability in a wide range of applications. A batch process can be initiated to find which models provide a best fit to the incoming information objects (e.g., based on a selected metric or set of metrics). Such search results could be presented directly in the best-fit model(s) instead of the user needing to identify a model in advance of the search.

In addition, once the incoming fragments are automatically populated on models, various learning mechanisms such as genetic optimization are also envisioned where multiple generations of anchors can be automatically created (from a cluster of fragments) or modified (exemplars are added/deleted) using automated computer algorithms.

In addition, when using the modeler framework as a search tool, query pre-processing can be done to improve coherence. For example, imagine a user is searching for vacation destinations using an instantiated vacation model. To automatically provide even deeper context, the user may additionally select/create one or more "coherence fragments" (optionally self-signified), which are fragments that are representative of the ideal vacation experience they seek. A coherence fragment can be self created (e.g., written themselves about a great vacation last year) or be selected from any source such as a magazine article or romance novel. When a search is initiated with the vacation model, the context of the coherence fragments(s) provides an additional filter to help find the optimal search results for that user.

Additionally, the concept of coherence fragments can be used in an advertising context to improve advertising targeting. Instead of relying on the crude practice of associating advertiser ads with keywords as is common practice today (e.g., Google Adwords®), advertisers could provide one or more fragments (optionally signified) associated with the product/service they wish to advertise. The deep context inherent in the models (in whole or in part), coupled with the context of the coherence fragments, is a much more preferable matching mechanism to provide deeper relevance.

Additionally, comparing models is contemplated, as sometimes it is beneficial to compare entire complex meanings contained in multiple models. For example, when users are searching for recommendations such as music, a user's personalized music model can be compared to other accessible user music models. Recommendations can be made based on best-fit of models. Knowledge workers can use the models for many purposes such as a search mechanism, a monitor by scanning incoming information objects to sense or see shifts/movements in the patterns, and/or to draw insights from the incoming signified fragments in relation to one another and anchors. This invention can also be used in anti-terrorism or horizon scanning, as a monitor that can further be used as an early warning system.

EXAMPLE 10

Consider how expert knowledge can be captured and reused, effectively creating codified knowledge assets. In this example, a model is developed to aid in helping to better understand the potential for success and the potential for failure of a particular product or proposed business venture. A model is built using signifiers whereby the signifier prompts/signifier ranges have been pre-established 186 (FIG. 8). On a website, thousands of fragments are volunteered 188 and signified 190 by the top innovators. After determining that the collected signified fragments adequately cover the full range of each signifier 194, a classifier is trained 196 and hundreds of thousands more fragments are collected 198 and automatically signified 200 using the trained classifier. In a half-day workshop, ten innovation experts work together to instantiate the model. They first select a graphic representation 202 (FIG. 10), which is displayed on a computer screen 204. They agree to use anchors 206 and locate two anchors on the graphic representation 208. Through discovery and representation 212, they abstract key insights from the collection of signified fragments by selecting, for this example, over 50,000 signified fragments 214 and assigning them to one of the two appropriate anchors 216. Their newly created model captures ways of making sense of key issues in innovation.

The ten innovation experts instantiate a simple model with two anchors relating to two extremes: success and failure, where exemplars in each anchor relate to successful and non-successful new inventions and product launches. These anchors are represented on a simple model. A knowledge worker in the petroleum industry, for example, seeking innovation in her sector and having access to this model, selects this model 282 (FIG. 12) and populates the model with a number of fragments related to her industry 286. As the fragments were already indexed 288, the new fragments are automatically fit to the model 290 and displayed to the screen 298. The new fragments cluster around the success and failure anchors. In effect, a preferred embodiment of the present invention has achieved a conceptual blend of business success and failure with a potentially unrelated industry sector. The most closely clustered petroleum industry fragments to the success anchor will likely need closer attention as high priority ideas to consider, or, on the other extreme, fragments near the failure anchor should be interpreted as potential warnings. This example supports studies in the field of innovation that suggest that the most successful innovations share similarities to existing successes and completely radical disconnected ideas fare much worse in becoming successful.

EXAMPLE 11

In another application demonstrating expert knowledge transfer, imagine getting an expert or otherwise inaccessible (e.g., al-Qaida) group to manually signify fragments 190 for whatever purpose (e.g., cultural issues related to home/work balance). Now, assuming enough signified fragments have been captured and that the signified fragments adequately cover the full range of each signifier 194, based solely on these manually signified fragments, a classifier can be built 196 and can be used for unlimited purposes (see FIGS. 9B-9C). Such expert knowledge transfer can be accomplished with as little as one expert but based on the learnings of distributed cognition, more experts will create richer knowledge than any one single expert.

Legacy Databases

The methods disclosed herein may be applied to integrating different databases into a single database, and to analyzing as a whole the data contained in multiple databases. For example, the methods may be applied to analyzing data contained in multiple databases that have already been created and populated by an organization, sometimes called legacy databases.

Over time, organizations often generate and maintain many different databases with inconsistent formats (e.g., different technical engineering databases, marketing, customer, and/or supplier information databases, component databases, document databases, etc.). Legacy databases in an organization contain a wealth of information, but each legacy database is typically directed to a very specific purpose. Collectively, the data in legacy databases may provide information and insights well beyond the original purposes for which they were developed. There remains a need for improved ways for more insightful pattern analysis across the knowledge contained in multiple databases.

In a preferred embodiment of the present invention, organizations can integrate legacy database systems by treating database elements as fragments and signifiers. For example, if the database elements in multiple databases are represented as more generic fragments and signifiers, then the signified data may be consolidated or integrated and are viewable/discoverable as signifiers and fragments. The discovery and representation methods discussed above may be applied to the integrated data to identify patterns and insights. Complex relationships can be navigated using the many methods disclosed herein, giving new ways to look at the problem space such as looking for correlations amongst database elements. Examples of how database elements can be represented include:

(1) Define algorithms and rules to automatically translate database elements into fragments and signifiers based on the database structures.

(2) If narrative material needs to be consolidated, a portion of the material may be manually signified, and a classifier can be trained and then used to automatically signify the remaining material (see FIGS. 9A-9C).

For example, two or more legacy databases may be selected for integration. The structure of the databases including the field definitions may provide signification for the data (or information objects) contained therein. Alternatively, an automated analysis of the data, perhaps guided by a knowledge of the structure of each database, may be used to signify the data.

Of course, other methods disclosed herein may alternatively be used to signify the data. For example, a deliberately ambiguated signifier prompt may be developed, and the data in one or more of the legacy databases may be manually signified. If suitable, a subset of the data may be manually signified, and a classifier (as discussed above) developed to signify the remaining data.

By representing the data in multiple databases as signified fragments, the databases may be combined for a particular analysis.

It is contemplated that the present invention may be practiced in a number of different modes or embodiments. For example, the present invention may be implemented as:

To aid the reader in understanding various ways the above-disclosed methods may be applied, it is contemplated that these building blocks may be variously applied in different configurations. For example, A1. A method for automatically signifying information objects comprising the steps:

collecting a first set of information objects;

providing signifier prompts to indexers to allow signification of the collected information objects;

determining a desired range of responses to the signifier prompts;

receiving responses to the signifier prompts from the indexers for the first set of information objects;

ensuring that the signifier responses cover the desired range of responses to the signifier prompts;

generating a classifier based on the received signifier responses to the signifier prompts;

collecting a second set of information objects; and using the classifier to signify the second set of information objects.

A2. A method for representing information objects to show context in the information objects, comprising the steps:

selecting a graphic representation template wherein the template comprises a plurality of regions, each region having a designated meaning;

identifying anchor locations on the template having a particular significance; identifying a first set of information objects that exemplify the particular significance of the anchor locations on the template, and assigning the information objects to the corresponding anchor locations;

obtaining a second set of information objects; and locating the second set of information objects on the template based on the relationship of the meaning for each of the second set of information objects with the meaning of the exemplary fragments.

A3. The method of A2, wherein the step of identifying anchor locations comprises using an initial set of information objects that have been already signified to help identify locations on the template having a particular significance.

A4. The method of A2, wherein the step of locating the second set of information objects comprises:

training an automated classifier using the initial set of information objects; and using the trained automated classifier to automatically position the second plurality of information objects on the graphic representation template.

A5. A method for representing information objects to show context in the information objects comprising the steps:

selecting a graphic representation template wherein the template comprises a plurality of regions, each region having a designated meaning;

identifying a first set of information objects that exemplify the particular significance of locations on the template, and assigning the information objects to the corresponding location of significance;

obtaining a second set of information objects; and locating the second set of information objects on the template based on the relationship of the meaning for each of the second set of information objects with the meaning of the exemplary fragments.

A6. The method of A5, wherein the step of identifying locations of significance comprises using an initial set of information objects that have been already signified to help identify locations on the template having a particular significance.

A7. The method of A5, wherein the step of locating the second set of information objects comprises:

training an automated classifier using the initial set of information objects; and using the trained automated classifier to automatically position the second plurality of information objects on the graphic representation template.

A8. A method for auditing an aspect of an organization comprising the steps:

generating a first set of information objects from a first group signifying the first set of information objects with respect to the audited aspect;

analyzing the signifiers of the first set of information objects to develop a baseline measure to function as an indicator of the audited aspect;

periodically generating subsequent sets of information objects from subsequent groups comprising members of the organization;

signifying the subsequent sets of information objects;

analyzing the signifiers of the second set of information objects consistently with the step of analyzing the signifiers of the first set of information objects; and comparing the analysis of the signifiers of the second set of information objects with the baseline measure to identify changes in the audited aspect.

A9. The method for auditing of Claim A8, wherein the first set of information objects are signified by the first group and the subsequent sets of information objects are signified by subsequent groups.

A10. The method for auditing of A8, wherein the step of signifying the first set of information objects comprises responding to deliberately ambiguated signifier prompts.

A11. The method for auditing of A8, further comprising the step of determining set points that indicate a change in the audited aspect requiring further investigation, and notifying a member of the organization when the step of comparing the analysis indicates the set point has been met.

A12. A method for identifying patterns in a large set of information objects comprising:

selecting a topic for research;

developing at least one deliberately ambiguated signifier prompt related to the selected topic wherein the deliberately ambiguated signifier prompt comprises a prompt wherein the response is an indicated position along a continuum having a plurality of labeled points, and wherein none of the labeled points comprise a desired response;

generating a large set of information objects directed to information relating to the selected topic;

selecting a subset of information objects for manual analysis;

collecting a plurality of responses to at least one deliberately ambiguated signifier prompt for the information associated with the selected subset of information objects;

training an automatic classifier based on the collected responses;

using the classifier to produce responses to at least one deliberately ambiguated signifier prompt for other information objects not in the selected subset of information objects; and analyzing the responses to identify patterns in the information associated with the large set of information objects.

A13. A method for identifying patterns in a large set of information objects comprising:

selecting a topic for research;

developing at least one deliberately ambiguated signifier prompt related to the selected topic wherein the deliberately ambiguated signifier prompt is a multi-dimensional signifier prompt defining a multi-dimensional continuum having a plurality of labeled points and the response is an indicated position on the multi-dimensional continuum;

generating a large set of information objects directed to information relating to the selected topic;

selecting a subset of information objects for manual analysis;

collecting a plurality of responses to at least one deliberately ambiguated signifier prompt for the information associated with the selected subset of information objects;

training an automatic classifier based on the collected responses;

using the classifier to produce responses to at least one deliberately ambiguated signifier prompt for other information objects not in the selected subset of information objects; and analyzing the responses to identify patterns in the information associated with the large set of information objects.

A14. A method for mass capture of experiences and insights comprising:

providing individuals with a computer system comprising software for entering and signifying anecdotal information, wherein individuals are instructed to enter and signify their experiences and insights immediately after each experience or insight, wherein the signifying comprises responding to deliberately ambiguated signifier prompts;

collecting signified anecdotal information from the individuals;

exploring the responses to the deliberately ambiguated signifier prompts; and reviewing specific anecdotal information based on the exploration.

A15. A method for selectively analyzing a large set of signified information objects comprising:

collecting a large set of information objects;

signifying the information objects, wherein at least a portion of the signification is produced by responding to deliberately ambiguated signifier prompts;

selecting suitable axes based on the signification of the information objects for generating a landscape of the signification data;

generating the landscape with links to the information objects; and using the landscape to identify potentially relevant information objects, and reviewing only the identified potentially relevant information objects.

A16. The method of A15, wherein one axis represents stability.

A17. A method for seeking greater understanding of an issue from mass opinion capture comprising the steps:

creating a set of information objects and signifier prompts related to an issue;

providing this set of information objects and signifier prompts to a plurality of individuals, wherein at least a portion of the signification is produced by responding to deliberately ambiguated signifier prompts;

collecting the responses to the deliberately ambiguated signifier prompts from the plurality of individuals; and analyzing the responses to the deliberately ambiguated signifier prompts and their associated patterns to develop further understanding of the issue.

A18. The method of A17, further comprising the steps:

developing a baseline measure to function as an indicator of the mass opinion related to the issue;

periodically generating subsequent sets of information objects;

signifying the subsequent sets of information objects;

analyzing the signifiers of the second set of information objects consistently with the step of analyzing the signifiers of the first set of information objects; and comparing the analysis of the signifiers of the second set of information objects with the baseline measure to identify changes in opinion.

A19. The method of Claim A18, wherein the first set of information objects are signified by a first group and the subsequent sets of information objects are signified by subsequent groups.

A20. The method of Claim A19, further comprising the step of determining set points that indicate a change in opinion requiring further investigation, and creating a notification when the step of comparing the analysis indicates the set point has been met.

A21. A method for integrating data contained in a plurality of databases comprising the steps:

obtaining a first database containing a first plurality of information objects and a second database containing a second plurality of information objects, wherein the first database is structured differently from the second database;

signifying each of the first plurality of information;

signifying each of the second plurality of information objects;

combining the first plurality of signified information objects with the second plurality of signified information objects;

analyzing the combined first and second plurality of signified information objects based on the signifiers of the first and second plurality of signified information objects.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for analyzing a large set of data objects by auditing an attitude among a target population comprising:

providing a first set of information objects to a first group of a target population;

providing a deliberately ambiguated signifier prompt to the first group selected from the target population, wherein the deliberately ambiguated signifier prompt comprises a continuum having a plurality of labels and wherein the plurality of labels are identified with particular human attitudes;

collecting a first set of responses from the first group characterizing the first set of information objects using the deliberately ambiguated signifier prompt, and analyzing the first set of responses to produce a first quantitative measure-characterizing the first set of responses;

storing the first quantitative measure on a computer readable media;

providing a second set of information objects to a second group selected from the target population;

providing the deliberately ambiguated signifier prompt to the second group;

collecting a second set of responses from the second group characterizing the second set of information objects using the deliberately ambiguated signifier prompt, and analyzing the second set of responses to produce a second quantitative measure characterizing the second set of responses; and comparing the first quantitative measure with the second quantitative measure to identify changes in the particular human attitudes of the target population.

2. The method of claim 1, wherein the target population comprise stakeholders of an organization.

3. The method of claim 2, wherein the stakeholders are employees of the organization.

4. The method of claim 1, wherein the first and second sets of information objects comprise textual information objects.

5. The method of claim 1, wherein the first group and the second group comprise the same individuals.

6. The method of claim 1, wherein the labels specifying particular human attitudes are directed to a level of employee satisfaction of the target population.

7. The method of claim 1, wherein the labels specifying particular human attitudes are directed to attitudes related to safety procedures.

8. The method of claim 1, wherein the labels specifying particular human attitudes are directed to ethics.

9. The method of claim 1, wherein the deliberately ambiguated signifier prompt comprises a two-dimensional figure, and wherein individual information objects are characterized on the two-dimensional figure by identifying a positions on the two-dimensional figure.

10. The method of claim 1 further comprising supplementing the first and second sets of responses with additional signification of the information objects.

11. The method of claim 10, wherein the additional signification of the information object comprises a characteristic of the first group member providing the response to the information object.

12. The method of claim 1, wherein the deliberately ambiguated signifier prompt comprises a linear scale having paradoxical labels wherein the paradoxical labels specify undesirable attributes.

13. The method of claim 1, wherein the first and second sets of information objects are identical.

14. The method of claim 1, wherein the first and second sets of information objects comprise pictures.

15. The method of claim 1, further comprising repeating the steps of providing information objects to groups selected from the target population, collecting responses, analyzing responses to produce a quantitative measure characterizing the responses, and comparing the quantitative measure with previous quantitative measures on a periodic basis.

* * * * *

UNITED STATES PATENT AND TRADEMARK OFFICE
CERTIFICATE OF CORRECTION

PATENT NO. : 8,339,410 B2
APPLICATION NO. : 13/251032
DATED : December 25, 2012
INVENTOR(S) : S. A. Bealing et al.

It is certified that error appears in the above-identified patent and that said Letters Patent is hereby corrected as shown below:

| COLUMN | LINE | ERROR |
|---|---|---|
| 28 (Claim 1, | 24 line 15) | "measure-characterizing" should read --measure characterizing-- |

Signed and Sealed this
Fifteenth Day of October, 2013

Teresa Stanek Rea
*Deputy Director of the United States Patent and Trademark Office*